United States Patent
Saito et al.

(10) Patent No.: US 9,819,050 B2
(45) Date of Patent: Nov. 14, 2017

(54) NON-AQUEOUS ELECTROLYTE SECONDARY BATTERY

(71) Applicant: NISSAN MOTOR CO., LTD., Yokohama-shi, Kanagawa (JP)

(72) Inventors: Haruyuki Saito, Yokohama (JP); Manabu Kaseda, Yokohama (JP); Takayuki Fujii, Yokohama (JP); Hiroaki Tanizaki, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 10 days.

(21) Appl. No.: 14/891,088

(22) PCT Filed: May 9, 2014

(86) PCT No.: PCT/JP2014/062440
§ 371 (c)(1),
(2) Date: Nov. 13, 2015

(87) PCT Pub. No.: WO2014/185344
PCT Pub. Date: Nov. 20, 2014

(65) Prior Publication Data
US 2016/0093913 A1 Mar. 31, 2016

(30) Foreign Application Priority Data
May 17, 2013 (JP) .................. 2013-105352

(51) Int. Cl.
*H01M 4/62* (2006.01)
*H01M 10/0525* (2010.01)
(Continued)

(52) U.S. Cl.
CPC ......... *H01M 10/0525* (2013.01); *H01M 4/13* (2013.01); *H01M 4/62* (2013.01);
(Continued)

(58) Field of Classification Search
CPC ...... H01M 10/0525; H01M 4/13; H01M 4/62; H01M 4/1391; H01M 2004/021;
(Continued)

(56) References Cited

U.S. PATENT DOCUMENTS

2009/0191460 A1* 7/2009 Fujiwara ............ H01M 4/0402
429/209
2010/0297497 A1* 11/2010 Takahata ................ H01M 4/64
429/209

FOREIGN PATENT DOCUMENTS

| CN | 1893151 A | 1/2007 |
| CN | 1967915 A | 5/2007 |
| JP | 2010-080188 A | 4/2010 |

OTHER PUBLICATIONS

Yoon et al., "Method of Preparation for Particle Growth Enhancement of LiNi0.8Co0.15Al0.05O2", Electrochemical and Solid-State Letter, vol. 12, No. 11, Aug. 21, 2009, 4 pgs.

* cited by examiner

*Primary Examiner* — Cynthia K Walls
(74) *Attorney, Agent, or Firm* — Young Basile Hanlon & MacFarlane, P.C.

(57) ABSTRACT

A non-aqueous electrolyte secondary battery (large size cell) that has high output (low resistance) and high capacity makes it possible to improve the cycle characteristics of a battery by controlling the balance of the resistance between positive and negative electrodes. The non-aqueous electrolyte secondary battery has a positive electrode which comprises an active material and a conductive aid, a negative electrode, and an electrolyte layer, and having battery capacity of 3 Ah or more and an absolute value of battery internal resistance of 30 mΩ or less, in which the non-aqueous electrolyte second battery is characterized in that the zeta (ζ)
(Continued)

potential between the active material and the conductive aid is in the range of 0.3 mV to 2 mV as an absolute value.

2 Claims, 3 Drawing Sheets

(51) Int. Cl.
*H01M 4/13* (2010.01)
*H01M 10/052* (2010.01)
*H01M 4/131* (2010.01)
*H01M 4/525* (2010.01)
*H01M 4/02* (2006.01)
*H01M 4/1391* (2010.01)

(52) U.S. Cl.
CPC .......... *H01M 4/131* (2013.01); *H01M 4/1391* (2013.01); *H01M 4/525* (2013.01); *H01M 4/623* (2013.01); *H01M 4/625* (2013.01); *H01M 10/052* (2013.01); *H01M 2004/021* (2013.01); *H01M 2004/028* (2013.01); *H01M 2220/20* (2013.01)

(58) Field of Classification Search
CPC ...... H01M 4/623; H01M 4/131; H01M 4/525; H01M 2004/028; H01M 2220/20; H01M 4/625; H01M 10/052
See application file for complete search history.

NON-AQUEOUS ELECTROLYTE SECONDARY BATTERY

CROSS REFERENCE TO RELATED APPLICATION

The entire contents of the Japanese Patent Application No. 2013-105352 (filed on May 17, 2013) in which the priority right of the present patent application is claimed is herein incorporated by reference.

TECHNICAL FIELD

The present invention relates to a non-aqueous electrolyte secondary battery (large size cell) having high output (low resistance) and high capacity for an application in automobile or the like.

BACKGROUND

Recently, in the context of increased direction to environmental protection, electric vehicles (EV), hybrid electric vehicles (HEV) and fuel cell vehicles (FCV) are being developed. As a power source for driving a motor of these vehicles, a repeatedly rechargeable secondary battery is suitable. Particularly, non-aqueous electrolyte secondary batteries such as lithium-ion secondary battery that are expected to have high capacity and high output are attracting public attention.

The non-aqueous electrolyte secondary battery has a positive electrode active material layer containing a positive electrode active material (for example, $LiCoO_2$, $LiMnO_2$, and $LiNiO_2$) which is formed on a surface of a current collector. The non-aqueous electrolyte secondary battery also has a negative electrode active material layer containing a negative electrode active material (for example, lithium metal, carbon materials such as cokes or natural graphite and artificial graphite, metals such as Sn or Si, and oxide materials thereof) which is formed on a surface of a current collector. The non-aqueous electrolyte secondary battery also has an electrolyte layer containing a non-aqueous electrolyte solution or a gel electrolyte, which is provided between the positive electrode active material layer and the negative electrode active material layer to separate the positive electrode active material layer from the negative electrode active material layer. A secondary battery containing a non-aqueous electrolyte solution or a gel electrolyte (gel product obtained as a result of impregnating a non-aqueous electrolyte solution component in a polymer electrolyte) as such an electrolyte is called a "non-aqueous electrolyte secondary battery." Hereinbelow, when it is described simply as an electrolyte solution, it includes a non-aqueous electrolyte solution component in a gel electrolyte, in addition to a non-aqueous electrolyte solution.

According to the non-aqueous electrolyte secondary battery having the above-mentioned constitution, forming of a coating film on a surface of a negative electrode is promoted and the decomposition reaction of an electrolyte is inhibited during charge and discharge, thus yielding improved cycle characteristics.

However, according to the invention described in Japanese Patent Application No. 2010 080188, decomposition of an electrolyte solution still occurs due to a deviation in resistance in local area within a battery, for a battery (large size cell) with high output (low resistance) and high capacity which is applied for an automobile. Thus, the improvement of the cycle characteristics is not sufficient.

SUMMARY

Under the circumstances, an object of the present invention is, with regard to a non-aqueous electrolyte secondary battery (large size cell) with high output (low resistance) and high capacity, to achieve an improvement of the cycle characteristics of a battery by controlling a balance of resistance between positive and negative electrodes.

The inventors of the present invention found that, for a battery of a related art which did not have low resistance, the problem associated with the cycle characteristics could be solved simply by lowering the resistance of a negative electrode as described in Japanese Patent Application No. 2010 080188, but in a battery with low resistance and high capacity (large size cell), the problem could not be solved without controlling of a balance of resistance between positive and negative electrodes. In this regard, the inventors of the present invention found that, as a means for solving the problem, controlling zeta ($\zeta$) potential, as a substitute parameter of a balance of resistance between positive and negative electrodes, was effective. Namely, according to the present invention, a non-aqueous electrolyte secondary battery having battery capacity of 3 Ah or more and an absolute value of a battery internal resistance of 30 mΩ or less is characterized in that the zeta ($\zeta$) potential between an active material and a conductive aid is controlled to be in the range of 0.3 mV to 2 mV as an absolute value. As described herein, the range of 0.3 mV to 2 mV as an absolute value indicates the range of −20 mV to −0.3 mV and also the range of +0.3 mV to +2 mV.

DESCRIPTION OF THE EMBODIMENTS

Figure 1:
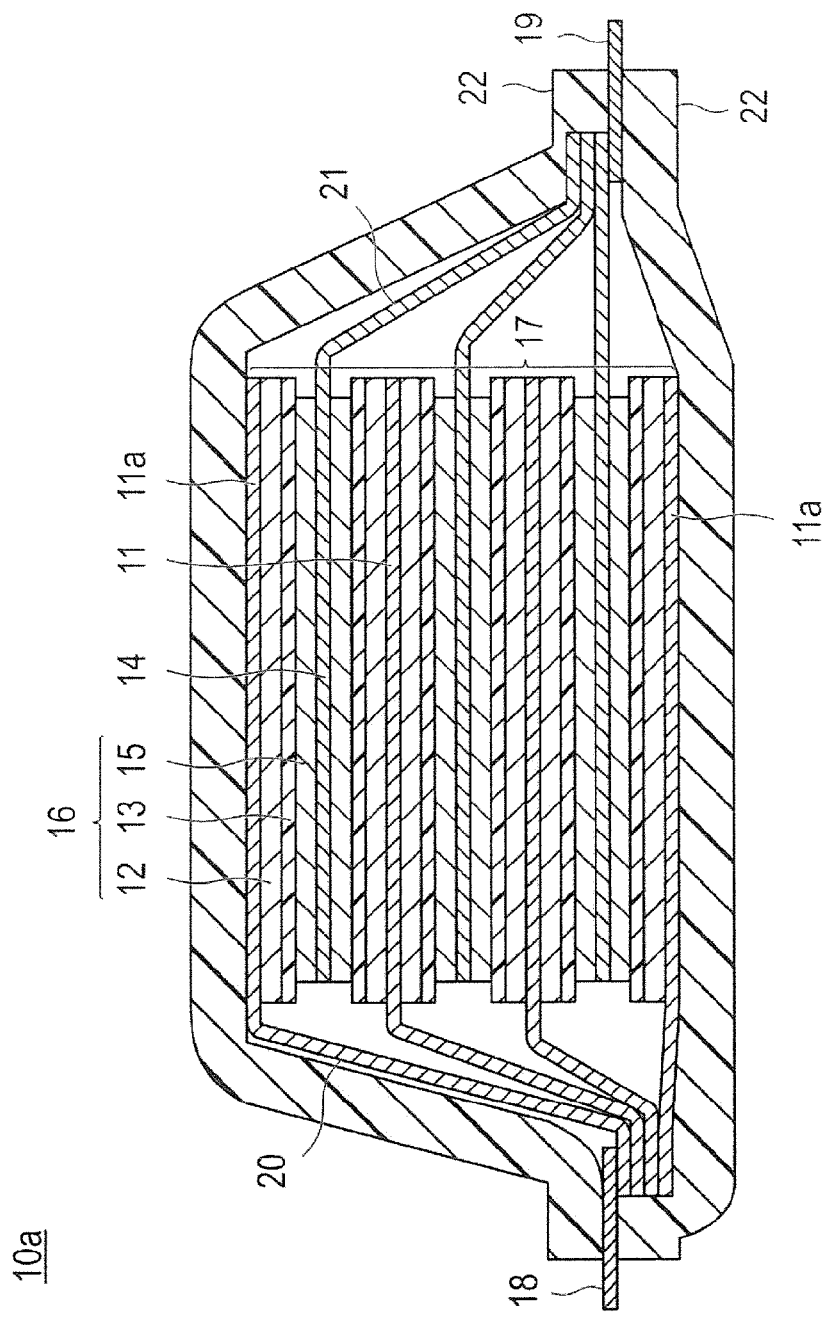
FIG. 1 is a brief cross-sectional view schematically illustrating the overall structure of a non-bipolar type lithium ion secondary battery (large size cell) with high output (low resistance) and high capacity according to one embodiment of the present invention.

The non-aqueous electrolyte secondary battery according to this embodiment is a battery (large size cell) which has a positive electrode, a negative electrode, and an electrolyte layer, and has battery capacity of 3 Ah or more and an absolute value of battery internal resistance of 30 mΩ or less. Furthermore, the non-aqueous electrolyte secondary battery (large size cell) with low resistance (high output) and high capacity according to this embodiment is characterized in that the zeta ($\zeta$) potential between the active material and the conductive aid is in the range of 0.3 mV to 2 mV as an absolute value. As the non-aqueous electrolyte secondary battery according to this embodiment has such constitution, the zeta (ζ) potential between the active material and the conductive aid in a battery (large size cell) with low resistance (high output) and high capacity is controlled so that a deviation in resistance within the electrode can be suppressed. Accordingly, decomposition of the electrolyte solution is suppressed, and thus the cycle characteristics of a battery (large size cell) with low resistance can be improved.

With regard to a conventional battery not having low resistance (lithium ion secondary battery (small size cell) used for a portable device or the like, which is also called "battery for household use"), the problem associated with cycle characteristics was solved simply by lowering the resistance of a negative electrode as described in Japanese Patent Application No. 2010 080188. However, for a battery with low resistance and high capacity (large size cell), it was found that the aforementioned problem could not be solved if a balance of the resistance between positive and negative electrodes was not controlled. Hereinbelow, detailed descriptions are given therefor. Unlike the battery for household use (small size battery), a non-aqueous electrolyte secondary battery (large size cell) with high output (low resistance) and high capacity is used for an application in an automobile like EV, HEV, and FCV. Accordingly, an electrode having a large area and allowing flow of large current is employed. When it is prepared to have a large area, the resistance deviation in a plane, which is caused by particle non-uniformity among the active materials that is generally small enough to be ignored, becomes to exhibit a large influence. It was found that, for such reasons, over-voltage is applied in local area, and thus there are caused new problems, such as a decomposition of an electrolyte solution and structural change of an active material in a positive electrode and a degradation (reduction) of cycle characteristics in a negative electrode by Li precipitation, which do not occur in a battery for household use (small size cell) like Japanese Patent Application No. 2010 080188. It was particularly found that the problem was significant in rapid charge that was required for an application in an automobile. Regarding this problem intrinsic to a non-aqueous electrolyte secondary battery (large size cell) having high output (low resistance) and high capacity, the slight resistance deviation in the electrode occurring during charge and discharge can be suppressed if an ordered mixture is formed by controlling of zeta potential between an active material and a conductive aid. Namely, when there is a significant difference in particle diameter so that the zeta potential is controlled so as to allow functioning of a strong interaction among particles, it is possible to obtain a mixture in which microparticles (conductive aid) are orderly arranged on a surface of crude particles (active material). Such mixture is referred to as an ordered mixture, and it can be said that the ordered mixture is in an ideal mixing state from the viewpoint of suppressing a slight resistance deviation which occurs locally. As a result, Li precipitation in a negative electrode during charge or the decomposition of an electrolyte solution and structural change of an active material in a positive electrode is suppressed so that the cycle characteristics can be improved. The present invention is completed accordingly.

Hereinbelow, a description will be made of a non-aqueous electrolyte secondary battery using the positive electrode active material of this embodiment. However, the technical scope of the present invention should be determined based on the descriptions of the claims and it is not limited to the embodiments that are given below. Meanwhile, note that dimensional ratios in the drawings are exaggerated for the sake of description, and can be different from actual ratios in some cases.

[Non-Aqueous Electrolyte Secondary Battery]

Representative examples of the non-aqueous electrolyte secondary battery of this embodiment include a lithium ion secondary battery. Namely, it is a non-aqueous electrolyte secondary battery which has a positive electrode containing a positive electrode active material allowing insertion and desorption of lithium ions, a negative electrode containing a negative electrode active material allowing insertion and desorption of lithium ions, and an electrolyte layer provided between the positive electrode and the negative electrode. For the descriptions given below, the descriptions are made by having a lithium ion secondary battery as an example, but the present invention is not limited thereto.

FIG. 1 is a brief cross-sectional view schematically illustrating the overall structure of a parallel-laminated lithium ion secondary battery (large size cell) with high output (low resistance) and high capacity according to one embodiment of the present invention (hereinbelow, it is also simply referred to as a "parallel lamination type battery"). As illustrated in FIG. 1, the parallel lamination type battery 10a of this embodiment has a structure in which the power generating element 17 with almost rectangular shape in which an actual charge and discharge reaction occurs is sealed inside the laminate film 22 as a battery outer casing material. More specifically, it has a configuration that the power generating element 17 is accommodated and sealed by using a polymer-metal composite laminate film as a battery outer casing material and bonding the entire periphery by thermal fusion.

The power generating element 17 has a constitution that the negative electrode, in which the negative electrode active material layer 12 is formed on both surfaces of the negative electrode current collector 11 (for the lowermost layer and the uppermost layer of the power generating element, only on a single surface), the electrolyte layer 13, and the positive electrode, in which the positive electrode active material layer 15 is formed on both surfaces of the positive electrode current collector 14, are laminated. Specifically, the negative electrode, the electrolyte layer 13, and the positive electrode are laminated in this order such that one negative electrode active material layer 12 and the positive electrode active material layer 15 adjacent thereto can face each other via the electrolyte layer 13. As for the positive electrode active material layer, a positive electrode active material with specific composition and structure is used as described below.

Accordingly, the negative electrode, the electrolyte layer 13, and the positive electrode that are adjacent to each other form one single battery layer 16. Thus, it can be said that the parallel lamination type battery 10a of this embodiment has a constitution of electric parallel-connection as several single battery layer 16 are laminated. Furthermore, on the outer periphery of the single battery layer 16, a seal part (insulation layer) (not illustrated) to insulate between the negative electrode current collector 11 and the positive electrode current collector 14, which are adjacent to each other may be formed. For the outermost negative electrode current collector 11a which is present on both outermost layers of the power generating element 17, the negative electrode active material layer 12 is provided only on a single surface. Meanwhile, it is also possible that, by reversing the arrangement of the negative electrode and positive electrode of FIG. 1, the outermost positive electrode current collector can be prepared to be present on both outermost layers of the power generating element 17 and the positive electrode active material layer can be prepared to be present on a single surface of the corresponding outermost positive electrode current collector.

The negative electrode current collector 11 and the positive electrode current collector 14 are provided with the negative electrode current collecting plate 18 and the positive electrode current collecting plate 19, respectively, that are conductively connected with each electrode (the negative electrode and the positive electrode), in which the plates are inserted to the terminal part of the laminate film 22 and led to the outside of the laminate film 22. If necessary, the negative electrode current collecting plate 18 and the positive electrode current collecting plate 19 may be attached, by ultrasonic welding or resistance welding, to the negative electrode current collector 11 and the positive electrode current collector 14 of each electrode via the negative electrode terminal lead 20 and positive electrode terminal lead 21, respectively (this mode is illustrated in FIG. 1). However, it is also possible that the negative electrode current collector 11 is extended to become the negative electrode current collecting plate 18, which is then led to the outside of the laminate film 22. Similarly, it is also possible that the positive electrode current collector 14 is extended to become the positive electrode current collecting plate 19, which is then led to the outside of the laminate film 22.

Figure 2:
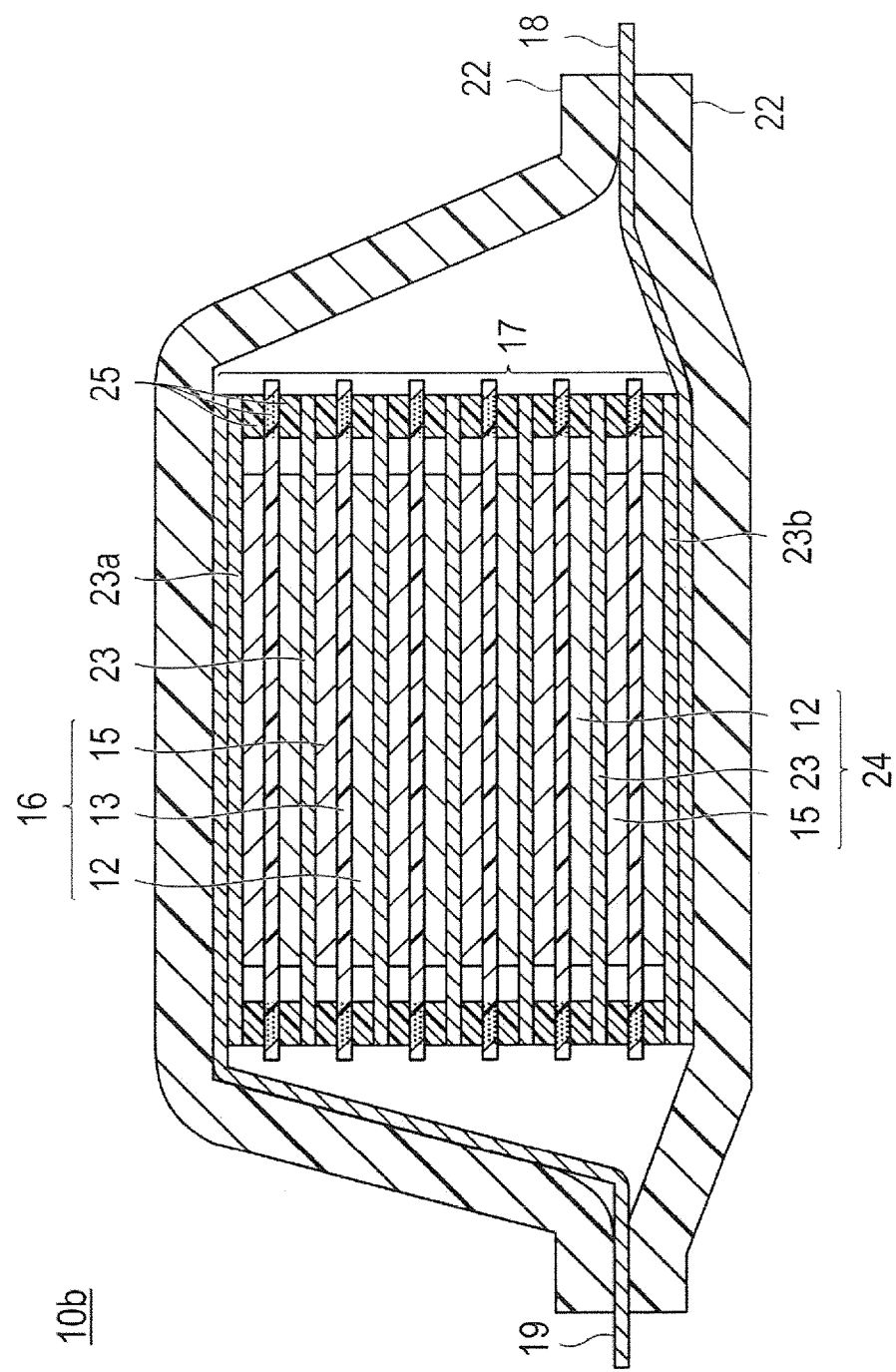
FIG. 2 is a brief cross-sectional view schematically illustrating the overall structure of a bipolar type lithium ion secondary battery (large size cell) with high output (low resistance) and high capacity according to one embodiment of the present invention.

FIG. 2 is a brief cross-sectional view schematically illustrating the overall structure of a series-laminated bipolar type lithium ion secondary battery (large size cell) with high output (low resistance) and high capacity (hereinbelow, it is also simply referred to as a "series lamination type battery") according to one embodiment of the present invention. As illustrated in FIG. 2, the series lamination type battery 10*b* has a structure in which the power generating element 17 with almost rectangular shape in which an actual charge and discharge reaction occurs is sealed inside the laminate film 22 as a battery outer casing material.

As illustrated in FIG. 2, the power generating element 17 of the series lamination type battery 10*b* has plural the bipolar type electrode 24 in which the positive electrode active material layer 15 is formed, based on electric binding, on one surface of the current collector 23 and the negative electrode active material layer 12 is formed, based on electric binding, on a surface opposite to the current collector 23. As for the positive electrode active material layer, a positive electrode active material having specific composition and structure as described below is used. Each bipolar type electrode 24 is laminated via the electrolyte layer 13 to form the power generating element 17. Meanwhile, the electrolyte layer 13 has a constitution obtained by maintaining the electrolyte in the center part in a plane direction of a separator as a substrate. In this case, each of the bipolar type electrode 24 and the electrolyte layer 13 are alternately laminated such that the positive electrode active material layer 15 of one bipolar type electrode 24 and the negative electrode active material layer 12 of the other bipolar type electrode 24, which is adjacent to the above bipolar type electrode 24, can face each other via the electrolyte layer 13. Namely, the arrangement is made such that the electrolyte layer 13 is inserted between the positive electrode active material layer 15 of one bipolar type electrode 24 and the negative electrode active material layer 12 of the other bipolar type electrode 24, which is adjacent to the above bipolar type electrode 24.

The positive electrode active material layer 15, the electrolyte layer 13, and the negative electrode active material layer 12 that are adjacent to one another constitutes a single battery layer 16. Thus, it can be said that, according to lamination of plural single battery layer 16, the series lamination type battery 10*b* of this embodiment has a constitution of electrical connection in series. Furthermore, for the purpose of preventing liquid junction caused by leak of an electrolyte solution from the electrolyte layer 13, a seal part (insulation part) 25 is formed on the outer periphery of the single battery layer 16. Meanwhile, with regard to an outermost current collector on the positive electrode side 23*a* which is present on the outermost layer of the power generating element 17, the positive electrode active material layer 15 is provided only on a single surface. Furthermore, with regard to an outermost current collector on the negative electrode side 23*b* present on the outermost layer of the power generating element 17, the negative electrode active material layer 12 is provided only on a single surface. However, it is also possible that the positive electrode active material layer 15 is formed on both surfaces of the outermost current collector on the positive electrode side 23*a*. Similarly, it is also possible that the negative electrode active material layer 12 is formed on both surfaces of the outermost current collector on the negative electrode side 23*b*.

Furthermore, in the series lamination type battery 10*b* illustrated in FIG. 2, the positive electrode current collecting plate 19 is formed such that it can be adjacent to the outermost current collector on the positive electrode side 23*a*, and the plate 19 is extended and led to the outside of the laminate film 22 as a battery outer casing material. Meanwhile, the negative electrode current collecting plate 18 is formed such that it can be adjacent to the outermost current collector on the negative electrode side 23*b*, and the plate 18 is similarly extended and led to the outside of the laminate film 22 as a battery outer casing material.

In the series lamination type battery 10*b* illustrated in FIG. 2, the insulation part 25 is generally formed around each single battery 16. The insulation part 25 is formed for the purpose of preventing short circuit or the like which is caused by a contact between neighboring current collectors 23 in the battery or small irregularities on the terminal part of the single battery layer 16 of the power generating element 17. By having the insulation part 25, long-term reliability and safety is ensured so that the series lamination type battery 10*b* with high quality can be provided.

Meanwhile, the lamination number of the single battery layer 16 is adjusted depending on target voltage. Furthermore, if sufficient output can be obtained in the series lamination type battery 10*b* even if the battery thickness is reduced as much as possible, the lamination number of the single battery layer 16 can be reduced. For using the series lamination type battery 10*b*, it is also necessary to prevent a shock from outside in use and degradation in environment. As such, it is preferable to have a configuration that the power generating element 17 is sealed under reduced pressure in the laminate film 22 as an outer casing material and the positive electrode current collecting plate 19 and the negative electrode current collecting plate 18 are led to the outside of the laminate film 22.

The non-aqueous electrolyte secondary battery of this embodiment which is represented by the FIG. 1 and FIG. 2 is a battery with high output (low resistance) and high capacity.

(With Regard to Requirements of Large Size Cell with High Capacity)

The non-aqueous electrolyte secondary battery (large size cell) with high capacity of this embodiment has high capacity, battery capacity of 3 Ah or more, and preferably 5 Ah or more. Accordingly, large current is allowed to flow and the cruise distance per single charge can be increased when it is used for an application in an automobile like EV, HEV, and FCV.

The battery capacity of this embodiment can be measured according to the following method.

First, as a constant current mode, it is charged to 4.2 V based on constant current mode (CC, current: 0.1 C) at 25° C. Then, after resting for 10 minutes, it is discharged to 2.5 V at constant current (CC, current: 0.1 C) followed by discharge and resting again for 10 minutes. The discharge capacity at that time is defined as the battery capacity of this embodiment.

(With Regard to Requirements of Large Size Cell with Low Resistance)

With regard to the non-aqueous electrolyte secondary battery (large size cell) with low resistance of this embodiment, the absolute value of battery internal resistance is 30 mΩ or less and preferably 20 mΩ or less. Accordingly, large current is allowed to flow and an electrode with large area can be handled when it is used for an application in an automobile like EV, HEV, and FCV, and thus high output can be obtained. Meanwhile, if the absolute value of battery internal resistance is more than the upper limit (higher than 30 mΩ), it is not possible to have high output (due to the over-voltage, maintained capacity cannot be utilized). Meanwhile, it is preferable that the absolute value of battery internal resistance is as low as possible, and the specific lower limit is not present.

The absolute value of battery internal resistance of this embodiment can be measured according to the following method.

First, as a constant current mode, the non-aqueous electrolyte secondary battery of this embodiment is charged to 3.9 V based on constant current mode (CC, current: 1 C) at 25° C. Then, after resting for 10 minutes, it is discharged for 20 seconds at constant current (CC, current: 1 C) followed by discharge and resting again for 10 minutes. The resistance measured from the voltage drop based on Ohm's law is defined as battery internal resistance. During the process, an impedance analyzer (manufactured by Solartron) is connected to the current collecting tabs of the positive electrode and negative electrode of the non-aqueous electrolyte secondary battery of this embodiment to measure the alternating current impedance. The frequency is set at 0.05 Hz to 3000 Hz.

Furthermore, with regard to the non-aqueous electrolyte secondary battery of this embodiment, the area defined value of battery internal resistance is preferably in the range of 40 Ω·cm² or less, and more preferably in the range of 30 Ω·cm² or less. Accordingly, large current is allowed to flow and an electrode with large area can be handled and high output can be obtained when it is used for an application in an automobile like EV, HEV, and FCV. Meanwhile, if the area defined value of battery internal resistance is more than the upper limit (higher than 40 Ω·cm²), it is not possible to have high output (due to the over-voltage, possessing capacity cannot be utilized). Meanwhile, it is preferable that the area defined value of battery internal resistance is as low as possible, and the specific lower limit is not present.

The area defined value of battery internal resistance of this embodiment can be measured according to the following method.

First, as a constant current mode, the non-aqueous electrolyte secondary battery of this embodiment is charged to 3.9 V based on constant current mode (CC, current: 1 C) at 25° C. Then, after resting for 10 minutes, it is discharged for 20 seconds at constant current (CC, current: 1 C) followed by discharge and resting again for 10 minutes. The resistance measured from the voltage drop based on Ohm's law is defined as battery internal resistance. Then, the value of battery internal resistance is multiplied by the cell area to calculate the resistance per unit area (area defined value).

Meanwhile, with regard to the relationship between the zeta potential of an active material and electrode internal resistance (the absolute value of battery internal resistance, or moreover, the area defined value of battery internal resistance), the followings can be said. First, the zeta potential of an active material is an indicator which represents the uniformity of resistance in a plane direction or a direction perpendicular to a plane in an electrode. When the zeta potential in an electrode is uniform three-dimensionally, it can be said that the absolute value of electrode internal resistance is also uniform. Furthermore, the area defined value of battery internal resistance is a resistance value per unit area, which is obtained by multiplying the absolute value by cell area. In this regard, definition is also made in this embodiment for the area defined value of battery internal resistance, in order to exclude a deviation in resistance value that is caused by dimensional error in electrode size during each step for manufacturing a battery.

Hereinbelow, each constitution (each member) of the non-aqueous electrolyte secondary battery is described in greater detail.

[Positive Electrode]

Together with a negative electrode, the positive electrode has a function of generating electric energy by releasing and receiving lithium ions. The positive electrode essentially has a current collector and a positive electrode active material layer, and it is obtained by forming a positive electrode active material layer on a surface of a current collector.

(Current Collector)

The collector is composed of a conductive material, and a positive electrode active material layer is arranged on its one surface or both surfaces. The material for constituting the collector is not particularly limited. For example, it is possible to use a metal or a resin having conductivity in which a conductive filler has been added to a conductive polymer material or a non-conductive polymer material.

As the metal, examples include aluminum, nickel, iron, stainless steel (SUS), titanium, and copper. Besides these, it is possible to preferably use a cladding material of nickel and aluminum, a cladding material of copper and aluminum, a plating material made of a combination of these metals, etc. It may be a foil prepared by covering the metal surface with aluminum. In particular, from the viewpoint of conductivity and battery operation potential, aluminum, stainless steel and copper are preferable.

Furthermore, examples of the conductive polymer material include polyaniline, polypyrrole, polythiophene, polyacetylene, polyparaphenylene, polyphenylene vinylene, polyacrylonitrile, polyoxadiazole, or a mixture of these, etc. By having sufficient conductivity even without adding a conductive filler, those conductive polymer materials are advantageous to facilitating the production process or having light weight of a current collector.

Examples of the non-conductive polymer material include polyethylene (PE; high density polyethylene (HDPE), low density polyethylene (LDPE)), polypropylene (PP), polyethylene terephthalate (PET), polyether nitrile (PEN), polyimide (PI), polyamide imide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), and polystyrene (PS). Such non-conductive polymer material can have a superior potential resistance or solvent resistance.

If necessary, it is possible to add the conductive filler to the above-mentioned conductive polymer material or non-conductive polymer material. In particular, in case that the resin as a base member of the current collector is formed of only the non-conductive polymer, the conductive filler becomes inevitably essential to provide the resin with conductivity. The conductive filler can be used without a particular limitation as long as it is a material having conductivity. For example, as a material superior in conductivity, potential resistance, or lithium ion shielding property, it is possible to mention metals, conductive carbons, etc. Although the metal is not particularly limited, it is preferable to contain at least one metal selected from the group consisting of Ni, Ti, Al, Cu, Pt, Fe, Cr, Sn, Zn, In, Sb, and K, or an alloy or metal oxide containing these metals. Furthermore, although the conductive carbon is not particularly limited, it is preferable to contain at least one selected from the group consisting of acetylene black, Vulcan, black pearl, carbon nanofiber, ketjen black, carbon nanotube, carbon nanohorn, carbon nanoballoon, and fullerene. The amount of the conductive filler to be added is not particularly limited as long as it is the amount capable of providing the current collector with a sufficient conductivity. In general, it is around 5 to 35% by mass.

The size of the current collector is determined depending on the use of the battery. For example, if it is used for a large size battery in which a high energy density is required, a current collector with a large area is used. The thickness of the current collector is not particularly limited, either. However, it is generally around 1 to 100 μm.

(Positive Electrode Active Material Layer)

The positive electrode active material layer essentially contains an active material and a conductive aid, and it is characterized in that the zeta (ζ) potential between the active material and conductive aid is within a pre-determined range. The positive electrode active material layer may further contain other additives such as a binder, an electrolyte (for example, polymer matrix, ion conductive polymer, and electrolyte solution), and lithium salt for enhancing ion conductivity in addition to the active material and conductive aid.

(Positive Electrode Active Material)

The positive electrode active material has a composition for allowing release of lithium ions at charge and absorption of lithium ions at discharge. Examples of the positive electrode active material include a lithium-transition metal composite oxide such as $LiMn_2O_4$, $LiCoO_2$, $LiNiO_2$, Li(Ni—Mn—Co)$O_2$ and a composite oxide in which part of the transition metal is replaced with other metal atom, a lithium-transition metal phosphate compound, and a lithium-transition metal sulfate compound. If necessary, two or more kinds of a positive electrode active material may be used in combination. Preferably, from the viewpoint of capacity and output characteristics, the lithium-transition metal composite oxide is used as a positive electrode active material. As a more preferable example, Li(Ni—Mn—Co)$O_2$ and a composite oxide in which part of the transition metal is replaced with other metal atom (hereinbelow, also simply referred to as the "NMC composite oxide") is used. The NMC composite oxide has a laminated crystal structure in which a lithium atom layer and a transition metal (Mn, Ni, and Co are arranged with regularity) atom layer are alternately stacked via an oxygen atom layer, one Li atom is included per atom of transition metal M and extractable Li amount is twice the amount of spinel lithium manganese oxide, that is, as the supply power is twice higher, and thus it can have high capacity.

As described above, the NMC composite oxide includes a composite oxide in which part of transition metal elements are replaced with other metal element. In that case, examples of other element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

Because of high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \le a \le 1.2$, $0 < b < 1$, $0 < c \le 0.5$, $0 < d \le 0.5$, $0 \le x \le 0.3$, and $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Co, d represents the atomic ratio of Mn, and x represents the atomic ratio of M. From the viewpoint of the cycle characteristics, it is preferable that $0.4 \le b \le 0.6$ in General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element is replaced by other metal element, and it is preferable that $0 < x \le 0.3$ in General Formula (1), in particular. By dissolving at least one selected from a group consisting of Ti, Zr, Nb, W, P, Al, Mg, V, Ca, Sr and Cr, the crystal structure is stabilized so that a decrease in battery capacity is prevented even after repeated charge and discharge, and thus, it is believed that excellent cycle characteristics can be achieved.

As a more preferred embodiment, b, c, and d in General Formula (1) satisfying $0.44 \le b \le 0.51$, $0.27 \le c \le 0.31$, and $0.19 \le d \le 0.26$ are preferable in terms of having excellent balance between capacity and durability.

It is needless to say that a positive electrode active material other than described above can be also used.

The average particle diameter of each active material contained in the positive electrode active material layer is, although not particularly limited, preferably 1 to 100 μm, and more preferably 1 to 30 μm from the viewpoint of having high output. More preferably, it is 10 to 30 μm, and it is preferred in terms of having a battery with high output (low resistance) and high capacity (large size battery) which has an electrode with large area.

(Method for Manufacturing Positive Electrode Active Material)

The active material is required to have the zeta (ζ) potential between the active material and conductive aid to be within a pre-determined range. The method for controlling ζ potential (modifying the ζ potential) is not particularly limited, but it is useful to change the conditions for manufacturing the active material, in particular, the calcination temperature. Production of an active material for controlling ζ potential (modifying the ζ potential) can be performed according to the following method.

First, production of an active material is not particularly limited, and a conventionally known method can be suitably used. Hereinbelow, descriptions are given for a method of obtaining a desired active material by preparing a calcination material (transition metal source) by using a co-precipitation and calcining the calcination material with a Li source, but it is not limited thereto. The production of an active material include a step for obtaining a calcination material (transition metal source) by co-precipitation (first step), a step for obtaining a calcination material by mixing the calcination material (transition metal source) with a Li source (second step), and a step for calcining the calcination material (third step). Hereinbelow, descriptions are given for each step.

(a) First Step; Step for Obtaining Calcination Material (Transition Metal Source) by Co-Precipitation The first step is not particularly limited as long as a calcination material (transition metal source) can be obtained by co-precipitation, and a conventionally known method can be used. For example, by supplying a precipitating agent (for example, sodium hydroxide) and a pH controlling agent (for example, ammonia) to an aqueous solution in which each inorganic acid (for example, sulfuric acid) salt of transition metals (for example, Mn, Co, Ni, and Al) is dissolved, a metal composite hydroxide can be prepared by co-precipitation method. However, in this embodiment, it is never limited to this production method.

(b) Second Step; Step for Obtaining Calcination Material

The second step is not particularly limited as long as calcination material (raw material mixture) can be obtained by mixing the calcination material (transition metal source) obtained from the first step with a Li source at pre-determined ratio, and a conventionally known method can be used. For example, the metal composite oxide obtained from the first step and a Li source (for example, lithium oxide monohydrate) are weighed such that a ratio of the mole number of total transition metals other than Li (for example, Mn, Co, Ni, and Al) and the mole number of Li is 1:1, for example. After that, by sufficiently mixing the metal composite oxide with lithium source, a calcination material (raw material mixture) can be prepared. However, in this embodiment, it is never limited to this production method.

(c) Third Step; Step for Calcining Calcination Material

The third step is not particularly limited as long as a desired active material can be obtained by calcining the calcination material (raw material mixture) obtained from the second step, and a conventionally known method can be used. For example, the calcination material (raw material mixture) obtained from the second step is heated at a pre-determined temperature increasing rate (for example, in the range of 5±3° C./min), and subjected to temporary calcination for 3 to 6 hours at 400 to 480° C. under oxygen atmosphere. After that, the temperature was increased at a pre-determined temperature increase rate (for example, in the range of 3±2° C./min) and the material was subjected to main calcination for 8 to 10 hours at 730 to 800° C. followed by cooling it to room temperature. Accordingly, a positive electrode active material (average particle diameter of 1 to 100 μm) consisting of lithium transition metal composite oxide with desired compositional formula can be obtained. However, in this embodiment, it is never limited to this production method.

Herein, when the calcination temperature is 730° C. or higher, a reduction in theoretical capacity can be prevented without lowering of the particle crystallinity. Furthermore, uniform distribution of an insulating coating film (coating film of amorphous (non-crystalline) oxide which does not inhibit desorption and absorption of lithium (charge and discharge reaction)), which is formed simultaneously with the production of an active material, can be obtained, and the zeta ($\zeta$) potential can be controlled to a desired range. On the other hand, when the calcination temperature is 800° C. or lower, uniform distribution of an insulating coating film (coating film of amorphous (non-crystalline) oxide which does not inhibit desorption and absorption of lithium (charge and discharge reaction)), which is formed simultaneously with the production of an active material, can be obtained, and the zeta ($\zeta$) potential can be controlled to a desired range. Meanwhile, the characteristic of this embodiment is to suppress a resistance deviation resulting from non-uniformity in a positive electrode which is caused by having an electrode with large area in a battery (large size cell) with low resistance and high capacity (large size cell). As a parameter for examining the uniformity in an electrode with large area, $\zeta$ potential is used (=it is not an insulation coating amount).

(Conductive Aid)

The conductive aid is an additive to be mixed for improving conductivity of the active material layer. As the conductive aid, it is possible to mention carbon black like acetylene black, ketjen black, and furnace black, carbon powder such as channel black, thermal black, or graphite, various carbon fibers such as vapor-grown carbon fiber (VGCF; a trade name), expanded graphite, etc. It is, however, needless to say that the conductive aid is not limited to these. If the active material layer contains a conductive aid, the electron network in the inside of the active material layer is effectively formed, thereby contributing to the improvement of output characteristics of a battery.

The content of the conductive aid to be contained in the positive electrode active material layer is not particularly limited, if it is an amount allowing an improvement of the conductivity of an active material. However, relative to the positive electrode active material layer, it is in the range of 0.5 to 15% by mass, more preferably in the range of 1 to 10% by mass, even more preferably in the range of 2 to 8% by mass, and still even more preferably in the range of 3 to 7% by mass.

This embodiment is characterized in that, when expressed as an absolute value, the zeta ($\zeta$) potential between the active material and conductive aid is in the range of 0.3 mV to 2 mV. Accordingly, a resistance deviation within an electrode can be suppressed. As a result, decomposition of an electrolyte solution in a positive electrode, a structural change of an active material in a positive electrode, or Li precipitation in a negative electrode during charge is suppressed so that the cycle characteristics of a battery (large size cell) having high output (low resistance) and high capacity which is used for an automobile can be improved. More specifically, a battery (large size cell) having high output (low resistance) and high capacity is required to be allowed to flow large current and to manage an electrode with large area. However, once a battery is prepared to have a large area, the resistance deviation in a plane, which is caused by particle non-uniformity among the active materials that is conventionally small enough to be ignored, becomes to exhibit a large influence. For such reasons, over-voltage is applied in local region to cause new problems like decomposition of an electrolyte solution and structural change of an active material in a positive electrode and degradation (reduction) of cycle characteristics in a negative electrode by Li precipitation, which do not occur in a battery for a household use (small size cell). This problem is particularly significant in rapid charge that is required for an application in an automobile. Regarding this problem intrinsic to a battery (large size cell) having high output (low resistance) and high capacity, the slight resistance deviation in the electrode occurring during charge and discharge can be suppressed by forming of ordered mixture based on control of zeta potential between an active material and a conductive aid. Namely, when there is a significant difference in particle diameter so that the zeta potential is controlled so as to allow functioning of a strong interaction among particles, it is possible to obtain a mixture in which microparticles (conductive aid) are orderly arranged on a surface of crude particles (active material). Such mixture is referred to as an ordered mixture, and it can be said that the ordered mixture is in an ideal mixing state from the viewpoint of suppressing a slight resistance deviation which occurs locally. As a result, decomposition of an electrolyte solution and structural change of an active material in a positive electrode or Li precipitation in a negative electrode is suppressed so that the cycle characteristics of a battery (large size cell) having high output (low resistance) and high capacity which is used for an automobile can be improved.

Figure 3A:
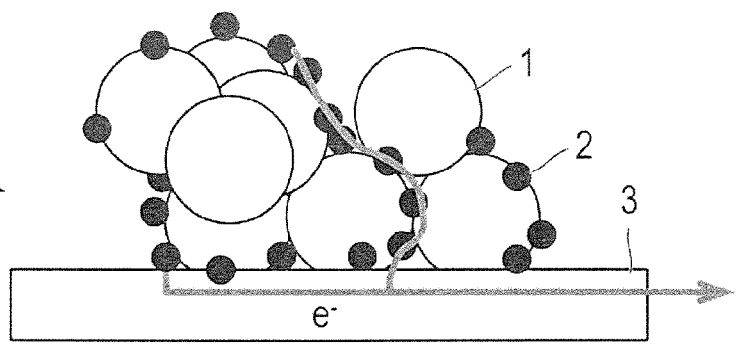
FIG. 3A is a brief cross-sectional view schematically illustrating a positive electrode in which a positive electrode active material layer of a prior art (only a single surface is shown) is formed on a current collector.
Figure 3B:
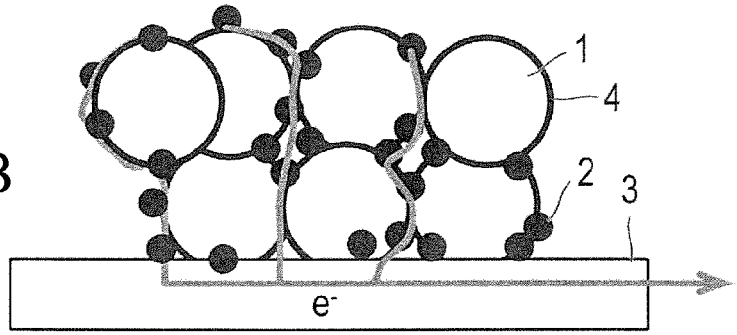
FIG. 3B is a brief cross-sectional view schematically illustrating a positive electrode in which a positive electrode active material layer of the present invention (only a single surface is shown) is formed on a current collector.

The top drawing in FIG. 3 is a brief cross-sectional view schematically illustrating a positive electrode in which a positive electrode active material layer of a prior art (only a single surface is illustrated) is formed on a current collector, and the bottom drawing is a brief cross-sectional view schematically illustrating a positive electrode in which a positive electrode active material layer of the present invention (only a single surface is illustrated) is formed on a current collector. In the bottom drawing of FIG. 3, a mixture (ordered mixture) in which the microparticle (conductive aid 2) is orderly present on a surface of crude particle (active material 1) is formed, and thus, when it is seen from the outside, it appears that the coating film 4 (three-dimensional conductive network) of the conductive aid 2 is formed on a surface of the active material 1. Accordingly, during charge and discharge, large current can be drawn from the current collector 3 via the coating film 4 of the conductive aid 2 at every corner of an electrode active material layer. Meanwhile, as it is illustrated in the top drawing of FIG. 3, in case of an active material layer of a related art, if the zeta ($\zeta$) potential between the active material 1 and the conductive aid 2 is beyond 0.3 mV (lower limit value) as an absolute value, the particles of the active material 1 and the conductive aid 2 are aggregated so that dispersion cannot be easily obtained and an ordered mixture cannot be formed, either. As a result, the aforementioned working effect cannot be sufficiently exhibited (see, Comparative Example 2). The expression of "beyond 0.3 mV (lower limit value) as an absolute value" means the range of more than −0.3 mV and less than +0.3 mV. Furthermore, as it is illustrated in the top drawing of FIG. 3, also for a case in which the zeta ($\zeta$) potential between the active material 1 and the conductive aid 2 is beyond 2 mV (upper limit value) as an absolute value, not only the handling property is deteriorated during production of an electrode but also the particles of the active material 1 and the conductive aid 2 are aggregated so that dispersion cannot be easily obtained and an ordered mixture cannot be formed, either. As a result, the aforementioned working effect cannot be sufficiently exhibited (see, Comparative Example 1). The expression of "beyond 2 mV (upper limit value) when expressed as an absolute value" means the range of less than −2 mV and the range of more than +2 mV.

The zeta ($\zeta$) potential between the active material and conductive aid of this embodiment can be measured according to the following method.

First, an active material and a conductive air are mixed with each other in a solvent (NMP), and the sample obtained after allowing it to stand for a while is additionally added to the solvent (NMP) followed by stirring, and measurement of the zeta ($\zeta$) potential using a zeta potentiometer was carried out. As for the device, the zeta potentiometer (ZEECOM, manufactured by Microtec Co., Ltd.) was used. Specifically, 5 mg of the sample was added to 200 mL of NMP and the measurement was performed under stirring till to have uniform liquid color in the flask. However, the present invention is not necessarily limited to it. The mixing ratio between the active material and conductive aid can be the blending ratio at the time of using them for actual fabrication of an electrode.

In this embodiment, it is preferable that the conductive aid is obtained by mixing a first conductive aid with specific surface area of 40 to 100 $m^2/g$ and a second conductive aid with specific surface area of 15 to 35 $m^2/g$ at ratio of 1:1 to 5:1 (mass ratio). By mixing and using two or more types of a conductive aids having different specific surface area, it become easier to form an ordered mixture so that a conductive path covering the entire reaction area of the active material can be formed. As a result, the slight resistance deviation in the electrode with large area that is included in a battery with high output (low resistance) and high capacity is suppressed, and thus the cycle characteristics of a battery with high output (low resistance) and high capacity can be improved.

The specific surface area of a first conductive aid is preferably in the range of 40 to 100 $m^2/g$, and more preferably in the range of 50 to 100 $m^2/g$. If the specific surface area of a first conductive aid is 100 $m^2/g$ or less, it is excellent in that the reaction resistance is not increased to excessive level, the balance of resistance between positive and negative electrodes is not disrupted, and a conductive path covering the entire reaction area of the active material can be formed. On the other hand, if the specific surface area of the first conductive aid is 40 $m^2/g$ or more, it is excellent in that the reaction resistance is not decreased to excessive level, the balance of resistance between positive and negative electrodes is not disrupted, and a conductive path covering the entire reaction area of the active material can be formed. It is also excellent in that the production cost is not significantly increased.

The specific surface area of a second conductive aid is preferably in the range of 15 to 35 $m^2/g$, and more preferably in the range of 15 to 30 $m^2/g$. If the specific surface area of a second conductive aid is 35 $m^2/g$ or less, it is excellent in that the reaction resistance is not increased to excessive level, the balance of resistance between positive and negative electrodes is not disrupted, and a conductive path covering the entire reaction area of the active material can be formed. On the other hand, if the specific surface area of a second conductive aid is 15 $m^2/g$ or more, it is excellent in that the reaction resistance is not decreased to excessive level, the balance of resistance between positive negative electrodes is not disrupted, and a conductive path covering the entire reaction area of the active material can be formed. It is also excellent in that the production cost is not significantly increased.

The first conductive aid with specific surface area of 40 to 100 $m^2/g$ and the second conductive aid with specific surface area of 15 to 35 $m^2/g$ can be suitably selected from the above-exemplified conductive aids. For example, among the conductive aids that are exemplified above, those found to be falling within the specific surface area range after performing the measurement according to the following method for measuring specific surface area can be used, or a commercially available conductive aid with known specific surface area can be used, and it is not particularly limited. Examples of the first conductive aid with specific surface area of 40 to 100 m²/g include acetylene black (VGCF-S manufactured by Showa Denko K.K. and HS-100 manufactured by DENKI KAGAKU KOGYO Co., Ltd.), ketjen black, and furnace black (SuperP manufactured by TIMCAL). The shape of the first conductive aid is, although not particularly limited, preferably a spherical shape. Average particle diameter of the first conductive aid is, although not particularly limited, to have a significant difference in the particle diameter and a strong interaction among particles, preferably in the range of 20 nm to 100 nm so that it can be advantageous to forming a mixture (ordered mixture) in which microparticles (conductive aid) are orderly arranged on a surface of crude particles (active material). Examples of the second conductive aid with specific surface area of 15 to 35 m²/g include carbon black (NC75 manufactured by DENKI KAGAKU KOGYO Co., Ltd.) and graphite (KS6 manufactured by TIMCAL). The shape of the second conductive aid is, although not particularly limited, preferably a spherical shape. Average particle diameter of the first conductive aid is, although not particularly limited, to have a significant difference in the particle diameter and a strong interaction among particles, preferably in the range of 20 nm to 10 μm so that it can be advantageous to forming a mixture (ordered mixture) in which microparticles (conductive aid) are orderly arranged on a surface of crude particles (active material). Meanwhile, the average particle diameter of the active material is as described above. However, as for the average particle diameter of the active material which is advantageous to mixing the first and second conductive aids with different specific surface area and also forming a conductive path covering the entire reaction area of the active material, it is more preferably in the range of 10 to 30 μm. From the same point of view, the shape of the active material is preferably a spherical shape. Also from the same point of view, the specific surface area of the active material is preferably in the range of 0.01 to 1.5 m²/g.

The specific surface area of the first conductive aid and the second conductive aid can be measured according to the following method.

Namely, the measurement can be made based on BET method (a method for calculating specific surface area based on physical adsorption phenomenon of inert gas at low temperature and low humidity) after both of the first conductive aid and the second conductive aid are adsorbed with inert gas like nitrogen.

Furthermore, the mixing ratio of the first conductive aid and the second conductive aid having the aforementioned specific surface area is preferably ratio of 1:1 to 5:1 (mass ratio), and it is more preferably ratio of 2:1 to 4:1 (mass ratio). When the mixing ratio is the same or greater more than the lower limit of 1:1 to 5:1 (the mixing amount (ratio) of the first conductive aid is the same or higher than the mixing ratio of 1:1), the reaction resistance is not decreased to excessive level and the balance of resistance between positive and negative electrodes is not disrupted so that a conductive path covering the entire reaction area of the active material can be formed. On the other hand, when the mixing ratio is the same or less than the upper limit of 1:1 to 5:1 (the mixing amount (ratio) of the first conductive aid is the same or lower than the mixing ratio of 5:1), the reaction resistance is not increased to excessive level, the balance of resistance between positive and negative electrodes is not disrupted so that a conductive path covering the entire reaction area of the active material can be formed.

The positive electrode active material layer may further contain other additives such as a binder, an electrolyte (for example, polymer matrix, ion conductive polymer, and electrolyte solution), and lithium salt for enhancing ion conductivity in addition to the active material and conductive aid.

(Binder)

The binder is added for the purpose of binding the constitutional members in an active material layer or binding between the active material layer and current collector so as to maintain the electrode structure. A binder used for the positive electrode active material layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene fluorine-based rubber (VDF-CTFE-based fluorine rubber), an epoxy resin, and the like. These binders may be each used singly, or two or more thereof may be used in combination.

The amount of the binder contained in the positive electrode active material layer is not particularly limited as long as the binder can bind the active material. However, the amount of binder is preferably 0 to 30% by mass relative to the positive electrode active material layer. It is preferably in the range of 0.5 to 15% by mass, more preferably 1 to 10% by mass, even more preferably 2 to 8% by mass, and particularly preferably 3 to 7% by mass. When the content of a binder like hydrophilic PVdF (an organic solvent based binder) is increased, the liquid absorption speed increases. However, it becomes disadvantageous to energy density. Furthermore, an excessively high amount of a binder causes increased battery resistance. As such, as the amount of a binder to be contained in a positive electrode active material layer is within the aforementioned range, the active material can be efficiently bound so that the effect of this embodiment can be further enhanced.

(Lithium Salt)

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

(Ion Conductive Polymer)

Examples of the ion conductive polymer include polyethylene oxide (PEO)-based and polypropylene oxide (PPO)-based polymer.

Furthermore, the porosity of the positive electrode active material layer is 20 to 30%, preferably 22 to 28%, and more preferably 23 to 25%. When it is within the aforementioned range, the liquid absorption speed of an electrolyte solution into an active material layer increases so that the ion conducting property in the active material layer is improved. Furthermore, sufficient energy density can be obtained, leading to an improvement of cycle durability.

A blending ratio of the components that are contained in the positive electrode active material layer and negative electrode active material layer is not particularly limited, unless it is specifically described. The blending amount (blending ratio) can be adjusted by suitably referring to the already-known knowledge about a lithium ion secondary battery.

The thickness of the positive electrode active material layer and negative electrode active material layer described below is not particularly limited either, and reference can be made to the already-known knowledge about a battery. For example, the thickness of each active material layer is about 2 to 100 μm.

[Negative Electrode]

Together with a positive electrode, the negative electrode has a function of generating electric energy by releasing and receiving lithium ions. The negative electrode essentially has a current collector and a negative electrode active material layer, and it is obtained by forming a negative electrode active material layer on a surface of a current collector.

(Current Collector)

The current collector usable for a negative electrode is the same as the current collector which can be used for a positive electrode, and thus further descriptions are omitted herein.

(Negative Electrode Active Material Layer)

The negative electrode active material layer contains a negative electrode active material. The negative electrode active material layer may further contain an additive like a conductive aid and a binder.

(Negative Electrode Active Material)

The negative electrode active material has a composition capable of releasing lithium ions at the time of discharge and absorbing lithium ions at the time of charge. The negative electrode active material is not particularly limited, as long as it is one capable of reversibly absorbing and releasing lithium. As examples of the negative electrode active material, it is possible to preferably mention metals, such as Si and Sn, or metal oxides, such as TiO, $Ti_2O_3$, $TiO_2$, or $SiO_2$, SiO and $SnO_2$, composite oxides of lithium and transition metals, such as $Li_4Ti_5O_{12}$ or $Li_7MnN$, Li—Pb series alloys, Li—Al series alloys, Li, or carbon materials, such as natural graphite, artificial graphite, carbon black, activated carbon, carbon fiber, coke, soft carbon, or hard carbon. Of these, the use of an element that forms an alloy with lithium makes it possible to obtain a battery of a high capacity and superior output characteristics, which has a higher energy density as compared with conventional carbon series materials. The negative electrode active material may be used alone, or may be used in the form of a mixture of at least two types. Although the element for forming an alloy with lithium is not limited to the following, but specific examples thereof include Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te, and Cl.

Among the above negative electrode active materials, it is preferable to contain at least one element selected from a group consisting of carbon material, and/or Si, Ge, Sn, Pb, Al, In and Zn, and it is more preferable to contain the carbon material, Si or Sn. It is particularly preferable to use a carbon material.

As for the carbon material, a carbonaceous particle having discharge potential lower than lithium is preferable, and examples thereof which may be used natural graphite, artificial graphite, blend of natural graphite and artificial graphite, a material obtained by coating amorphous carbon on natural graphite, soft carbon, and hard carbon. The shape of the carbonaceous particle is not particularly limited, and it can be any shape like bulk shape, spherical shape, and fiber shape, but it is preferably not flake shape. It is preferably spherical shape or bulk shape. Particle not having flake shape is preferable from the viewpoint of performance and durability.

Furthermore, the carbonaceous particle preferably has a surface coated with amorphous carbon. In that case, the entire surface of a carbonaceous particle is preferably coated with amorphous carbon, but it can be also partial coating. As the surface of a carbonaceous particle is coated with amorphous carbon, the reaction between graphite and an electrolyte solution during charge and discharge of a battery can be prevented. The method for coating a surface of graphite particle with amorphous carbon is not particularly limited. For example, there can be a wet method in which a carbonaceous particle (powder) to be a nucleus is dispersed and mixed in a mixed solution in which amorphous carbon is dissolved or dispersed in a solvent and the solvent is removed. Other than such method, a dry method in which a carbonaceous particle and amorphous carbon are admixed with each other in solid state and coating of amorphous carbon is performed by applying dynamic energy to the mixture, and a vapor phase method like CVD method can be mentioned. Coating of a carbonaceous particle with amorphous carbon can be confirmed by a method like laser spectrophotometry.

In addition, the BET specific surface area of the negative electrode active material is preferably 0.8 to 1.5 $m^2/g$. As the specific surface area is within this range, the cycle characteristics of a non-aqueous electrolyte secondary battery can be improved. In addition, the tap density of a negative electrode active material is preferably 0.9 to 1.2 $g/cm^3$. The density within this range is preferable from the viewpoint of energy density.

The average particle diameter of the negative electrode active material is, although not particularly limited, preferably 1 to 100 μm, and more preferably 1 to 30 μm from the viewpoint of having high capacity, reactivity, and cycle durability of a negative electrode active material.

The negative electrode active material layer may further contain other additives such as a conductive aid, a binder, an electrolyte (for example, polymer matrix, ion conductive polymer, and electrolyte solution), and lithium salt for enhancing ion conductivity.

(Conductive Aid)

The conductive aid which may be used for a negative electrode active material layer is the same as the conductive aid that can be used for the positive electrode active material layer. Namely, the conductive aid is an additive to be mixed for improving conductivity of the negative electrode active material layer. As the conductive aid, it is possible to mention carbon black like acetylene black, graphite and a carbon material like carbon fiber. If the active material layer contains a conductive aid, the electron network in the inside of the active material layer is effectively formed, thereby contributing to the improvement of output characteristics of a battery.

(Binder)

As for the binder which may be used for the negative electrode active material layer, the same binder as the binder that can be used for the positive electrode active material layer can be also used. Namely, it is added for the purpose of binding the constitutional members in an active material layer or binding between the active material layer and current collector so as to maintain the electrode structure. A binder used for the negative electrode active material layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinylidene chloride, styrene-butadiene rubber (SBR), isoprene rubber, butadiene rubber, ethylene-propylene rubber, an ethylene-propylene-diene copolymer, a styrene-butadiene-styrene block copolymer and a hydrogen-added product thereof, and a styrene-isoprene-styrene block copolymer and a hydrogen-added product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoride-perfluoromethyl vinyl ether-tetrafluoroethylene-based rubber (VDF-PFMVE-TFE-based fluorine rubber), and vinylidene fluoride-chlorotrifluoroethylene fluorine-based rubber (VDF-CTFE-based fluorine rubber), an epoxy resin, and the like. These binders may be each used singly, or two or more thereof may be used in combination.

The amount of the binder contained in the negative electrode active material layer is not particularly limited as long as the binder can bind the active material. However, the amount of binder is preferably 0 to 30% by mass relative to the negative electrode active material layer. It is preferably in the range of 0.5 to 15% by mass, more preferably 1 to 10% by mass, even more preferably 2 to 8% by mass, and particularly preferably 3 to 7% by mass. When the content of a binder like hydrophilic PVdF (an organic solvent based binder) is increased, the liquid absorption speed increases. However, it becomes disadvantageous to energy density. Furthermore, an excessively high amount of a binder causes increased battery resistance. As such, as the amount of a binder to be obtained in a negative electrode active material layer is within the aforementioned range, the active material can be efficiently bound so that the effect of this embodiment can be further enhanced.

The negative electrode active material layer may also contain an aqueous binder. Further, regarding the aqueous binder, since water as a raw material is easily available and also only water vapor is generated during drying, there is an advantage to greatly reducing the investment on facilities of a production line and an environmental load. Furthermore, the binding force for binding an active material is high, and as the mass ratio of a binder in the negative electrode active material layer can be reduced, the mass ratio of an active material can be increased as much as the reduced amount.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate (methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluororubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4000, and more preferably 1000 to 3000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene glycol, a copolymer of (meth)acrylamide and/or (meth)acrylic acid salt [(meth)acrylamide polymer, (meth)acrylamide-(meth) acrylic acid salt copolymer, alkyl (meth) acrylic acid (carbon atom number of 1 to 4) ester-(meth) acrylic acid salt copolymer, or the like], a styrene-maleic acid salt copolymer, a mannich modified product of polyacrylamide, a formalin condensation type resin (urea-formalin resin, melamin-formalin resin or the like), a polyamidepolyamine or dialkylamine-epichlorohydrin copolymer, polyethyleneimine, casein, soybean protein, synthetic protein, and a water soluble polymer such as mannan galactan derivatives. The aqueous binder can be used either singly or in combination of two or more types.

From the viewpoint of binding property, the aqueous binder preferably contains at least one rubber-based binder which is selected from a group consisting of styrene-butadiene rubber, acrylontitrile-butadiene rubber, methyl methacrylate-butadiene rubber, and methyl methacrylate rubber. Furthermore, from the viewpoint of having a good binding property, the aqueous binder preferably contains styrene-butadiene rubber (SBR). Furthermore, according to this embodiment, even for a case of using a negative electrode in which SBR having excellent binding property but not easily allowing impregnation of an electrolyte solution is used, the impregnation can be suitably progressed by setting the liquid absorption speed ratio between the positive electrode and negative electrode active material layer at a suitable range (namely, in the range of Tc/Ta=0.6 to 1.3). As a result, forming of a surface coating film is uniformly performed during initial charge step so that the battery resistance can be suppressed. It is particularly excellent in that sufficient battery performance can be exhibited, for example, retention rate after long-term cycle can be maintained or improved.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose (CMC), methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose are preferably combined as a binder. The mass content ratio between styrene-butadiene rubber and a water soluble polymer is, although not particularly limited, preferably as follows: styrene-butadiene rubber:water soluble polymer=1:0.2 to 2, and more preferably 1:0.5 to 1. The water soluble polymer may be classified as a thickening agent separate from an aqueous binder. In that case, the mixing ratio of styrene-butadiene rubber:water soluble polymer can be also interpreted as the mixing ratio between the aqueous binder and thickening agent.

When the water soluble polymer is classified as a thickening agent, the weight average molecular weight of a water soluble polymer (CMC of the like) is in the range of 5000 to 1200000, preferably 6000 to 1100000, and more preferably 7000 to 1000000. When the weight average molecular weight of a water soluble polymer is 5000 or more, the viscosity of aqueous slurry can be suitably maintained like suitable viscosity of aqueous slurry when a thickening agent is dissolved in water. As a result, it is advantageous to effectively using it as a thickening agent at the step of producing a negative electrode. On the other hand, when the weight average molecular weight of the water soluble polymer is 1200000 or less, the viscosity of aqueous slurry can be suitably maintained without becoming a gel state when the thickening agent is dissolved in an aqueous solvent like water. As a result, it is advantageous to effectively using it as a thickening agent during the process of producing a negative electrode. As for the method for measuring the weight average molecular weight of a water soluble polymer, the molecular weight distribution of a water soluble polymer can be measured by using gel permeation chromatography which uses a solvent containing metal-amine complex and/or metal-alkali complex as a mobile phase solvent. Based on the molecular weight distribution, the weight average molecular weight of a water soluble polymer can be calculated. Meanwhile, the method for measuring the weight average molecular weight of a water soluble polymer is not limited to the aforementioned method, and measurement and calculation can be made according to a conventionally known method.

When the water soluble polymer is classified as a thickening agent, content of the water soluble polymer is, relative to the total amount of a negative electrode active material layer, in the range of 0.1 to 10% by mass, and preferably 0.5 to 2% by mass. When the content of the water soluble polymer is 0.1% by mass or more, the thickening effect is sufficiently exhibited during the process of producing a negative electrode so that it is possible to prepare a negative electrode active material layer with smooth and sleek surface. It is also possible to provide a negative electrode excellent in terms of gas generation during initial charge of the obtained negative electrode but also having excellent capacity caused by improvement of charge and discharge efficiency. Furthermore, when it is 10% by mass or less, the viscosity of an aqueous slurry can be suitably adjusted based on excellent thickening effect so that a desired negative electrode active material layer can be obtained. It is also possible to provide a negative electrode excellent in terms of gas generation during initial charge of the obtained negative electrode but also having excellent capacity caused by improvement of charge and discharge efficiency.

In the binder used for a negative electrode active material layer, the content of the aqueous binder is preferably 80 to 100% by mass, preferably 90 to 100% by mass, and preferably 100% by mass. Examples of the binder other than an aqueous binder include the following binder which is used for a positive electrode active material layer (organic solvent-based binder).

The binder amount contained in a negative electrode active material layer is not particularly limited, if it is an amount allowing binding of an active material. However, relative to the negative electrode active material layer, it is preferably 0.5 to 15% by mass, more preferably 1 to 10% by mass, and even more preferably 2 to 5% by mass.

Furthermore, by having a high binding property, the aqueous binder can form a negative electrode active material layer at relatively lower addition amount compared to an organic solvent-based binder. Thus, the aqueous binder amount contained in a negative electrode active material layer is, relative to the negative electrode active material layer, preferably 0.5 to 15% by mass, more preferably 1 to 10% by mass, and even more preferably 2 to 5% by mass. When the content of an aqueous binder contained in a negative electrode active material layer is within the above range, a suitable amount of an aqueous binder can be present at an interface with a current collector. Thus, it is particularly excellent in that the aforementioned friction coefficient range can be obtained and optimum adhesion, peeling resistance, and shock resistance can be exhibited without causing disrupted aggregation when the active material layers are distorted according to input of shock from outside.

Furthermore, when the content of a binder like hydrophilic PVdF (an organic solvent based binder) is increased, the liquid absorption speed increases. However, it becomes disadvantageous to energy density. Furthermore, an excessively large amount of a binder causes increased battery resistance. As such, as the amount of an aqueous binder to be contained in a negative electrode active material layer is within the aforementioned range, the active material can be efficiently bound so that the effect of the present invention can be further enhanced. Namely, forming of a uniform coating film can be obtained, and the height of energy density and good cycle characteristics can be further improved.

(Lithium Salt)

Furthermore, as a lithium salt, the lithium salt which can be used for a negative electrode active material layer is the same as the lithium salt that can be used for the positive electrode active material layer. Namely, examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

(Ion Conductive Polymer)

The ion conductive polymer which can be used for a negative electrode active material layer is the same as the ion conductive polymer that can be used for the positive electrode active material layer. Namely, examples of the ion conductive polymer include polyethylene oxide (PEO)-based and polypropylene oxide (PPO)-based polymer.

Furthermore, the porosity of the negative electrode active material layer is 25 to 40%, preferably 30 to 35%, and more preferably 32 to 33%. When it is within the aforementioned range, the liquid absorption speed of an electrolyte solution into an active material layer increases so that the ion conducting property in the active material layer is improved. Furthermore, sufficient energy density can be obtained, leading to an improvement of cycle durability. As for the porosity of the positive electrode and negative electrode active material layers, the value obtained as a volume ratio which is obtained from the density of a raw material of an active material layer and the density of an active material layer in a final product is used. For example, when the density of a raw material is $\rho$ and the volume density of an active material layer is $\rho'$, the porosity of an active material layer is as follows: porosity=$100\times(1-\rho'/\rho)$.

In this embodiment, it is preferable that the reaction resistance ratio between the positive electrode and negative electrode (negative electrode/positive electrode), both are an electrode with large area, is in the range of 0.7 to 1.3. Accordingly, the balance in reaction resistance between the positive electrode and negative electrode can be controlled so that an occurrence of over-voltage on any one of those electrodes is prevented. Thus, Li precipitation in a negative electrode or decomposition of an electrolyte solution and a structural change in an active material in a positive electrode during charge are suppressed. As a result, the cycle characteristics are improved. The reaction resistance ratio between the positive electrode and negative electrode (negative electrode/positive electrode), both are an electrode with large area, is preferably in the range of 0.7 to 1.3, and more preferably in the range of 0.85 to 1.15. When the reaction resistance ratio between the positive electrode and negative electrode (negative electrode/positive electrode) is within the aforementioned range, rate controlling is achieved based on the reaction resistance on a side with high resistance and, by not having an increase in the total battery internal resistance, high output can be obtained.

The reaction resistance ratio between the positive electrode and negative electrode (negative electrode/positive electrode) can be measured and calculated according to the following method.

First, the non-aqueous electrolyte secondary battery (large size cell) having high output (low resistance) and high capacity of this embodiment which has been obtained after injecting an electrolyte solution is charged to 4.2 V based on constant current mode (CC, current: 0.1 C) at 25° C. Then, after resting for 10 minutes, it is discharged to 2.5 V at constant current (CC, current: 0.1 C) followed by discharge and resting again for 10 minutes.

The above state is defined as an "initial" state, and the reaction resistance is measured and calculated according to the following method.

First, the non-aqueous electrolyte secondary battery (large size cell) of this embodiment, which is in the "initial" state", is charged to 3.9 V based on constant current mode (CC, current: 1 C) at 25° C. Then, after resting for 10 minutes, it is discharged for 20 seconds at constant current (CC, current: 1 C) followed by discharge and resting again for 10 minutes. An impedance analyzer (manufactured by Solartron) is connected to the current collecting plate (tab) of the non-aqueous electrolyte secondary battery (large size cell) of this embodiment, which has been injected with a solution, to measure the alternating current impedance. The frequency is set at 0.05 Hz to 3000 Hz. From the arc size of each of the positive electrode and negative electrode, the reaction resistance ratio between the positive electrode and negative electrode (negative electrode/positive electrode) is calculated.

As for the relationship between the reaction resistance ratio between the positive electrode and negative electrode (negative electrode/positive electrode) and the mixing ratio of the first and second conductive aids, the followings can be noted. The difference between the first and the second conductive aid is a difference in specific surface area. As the specific surface area increases, a smaller reaction resistance of a positive electrode is obtained. Because the reaction resistance of a negative electrode is fixed, the reaction resistance ratio naturally increases as the positive electrode is reduced.

[Electrolyte Layer]

The electrolyte layer functions as a partition wall (spacer) between the positive electrode and the negative electrode. Furthermore, together with this, it also has a function of retaining the electrolyte as a transfer medium of lithium ions between the positive electrode and the negative electrode upon charge and discharge. The electrolyte constituting the electrolyte layer is not particularly limited. It is possible to suitably use a liquid electrolyte and a polymer gel electrolyte. According to this embodiment, an electrolyte layer in which a liquid electrolyte or a gel electrolyte is impregnated in a separator is preferable. An electrolyte layer in which a liquid electrolyte is impregnated in a separator is more preferable.

(Liquid Electrolyte)

The liquid electrolyte has a function of a lithium ion carrier. The liquid electrolyte has a constitution that a lithium salt is dissolved in an organic solvent. Examples of the organic solvent which can be used include carbonates such as ethylene carbonate (EC), propylene carbonate (PC), dimethyl carbonate (DMC), diethyl carbonate (DEC), and ethylmethyl carbonate.

Furthermore, as a lithium salt, the compound which can be added to an active material layer of an electrode such as $Li(CF_3SO_2)_2N$, $Li(C_2F_5SO_2)_2N$, $LiPF_6$, $LiBF_4$, $LiClO_4$, $LiAsF_6$, $LiTaF_6$, and $LiCF_3SO_3$ can be similarly used. Furthermore, the lithium ion concentration is preferably 0.1 to 5 mol/L and more preferably 0.1 to 2 mol/L.

The liquid electrolyte may further contain an additive in addition to the components that are described above. Specific examples of the compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methyleneethylene carbonate. Among them, vinylene carbonate, methylvinylene carbonate, and vinylethylene carbonate are preferable. Vinylene carbonate and vinylethylene carbonate are more preferable. Those cyclic carbonate esters may be used either singly or in combination of two or more types.

(Additives; Additive for Forming Coating Film (SEI), in Particular))

Furthermore, in case of a liquid electrolyte, it preferably contains at least one of organic sulfone compounds, organic disulfone compounds, vinylene carbonate derivatives, ethylene carbonate derivatives, ester derivatives, divalent phenol derivatives, terphenyl derivatives, phosphate derivatives, and lithium fluorophostate derivatives. By containing those additives, a coating film (SEI) is formed on a surface of a negative electrode active material, and it is excellent in that the cycle life is extended accordingly. In particular, lithium fluorophostate derivatives like lithium monofluorophostate and lithium difluorophostate are more preferable. The compound (additives) added to a liquid electrolyte (electrolyte solution) include organic sulfone compounds (sultone derivatives and cyclic sulfonic esters) like 1,3-propane sulfone (saturated sultone), 1,3-propene sultone (unsaturated sultone), etc., organic disulfone compounds (disultone derivatives and cyclic disulfonic esters) like methylene methane disulfonate, etc., vinylene carbonate derivatives like vinylene carbonate (VC), etc., ethylene carbonate derivatives like fluoroethylene carbonate (FEC), etc., ester derivatives like 4-biphenylyl acetate, 4-biphenylyl benzoate, 4-biphenylylbenzyl carboxylate and 2-biphenylyl propionate, dihydric phenol derivatives like 1,4-diphenoxybenzene and 1,3-diphenoxybenzene, ethylene glycol derivatives like 1,2-diphenoxyethane, 1-(4-biphenylyloxy)-2-phenoxyethane and 1-(2-biphenylyloxy)-2-phenoxyethane, etc., terphenyl derivatives like o-terphenyl, m-terphenyl, p-terphenyl, 2-methyl-o-terphenyl and 2,2-dimethyl-o-terphenyl, etc., phosphate derivates like triphenylphosphate, and lithium fluorophostate derivatives like lithium monofluorophostate and lithium difluorophostate. However, the present embodiment is not limited to them. The use of those additives is preferable from the viewpoint of performances and service life characteristics. The additives are contained in an electrolyte solution preferably at 0.1 to 5% by mass and more preferably at 0.5 to 3.5% by mass.

(Gel Electrolyte)

The gel electrolyte has a constitution in which the above-mentioned liquid electrolyte has been injected into a matrix polymer (host polymer) consisting of an ion conductive polymer. Use of a gel polymer electrolyte as an electrolyte is excellent in that the fluidity of an electrolyte disappears and the ion conducting property between each layer is easily blocked. Examples of the ion conductive polymer which is used as a matrix polymer (host polymer) include polyethylene oxide (PEO), polypropylene oxide (PPO), and a copolymer thereof. An electrolyte salt like lithium salt can be easily dissolved in those polyalkylene oxide-based polymers.

By forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator. Meanwhile, it is also possible that the electrolyte is contained in an active material layer of an electrode.

(Separator)

A separator has a function of maintaining an electrolyte to ensure the lithium ion conducting property between a positive electrode and a negative electrode and also a function of a partition wall between a positive electrode and a negative electrode.

Herein, in order to further improve the property of releasing the gas generated from a power generating element during initial battery charge, it is preferable to consider the property of releasing the gas reaching the separator after discharged from a negative electrode active material layer. From this point of view, the gas permeability or the porosity of a separator is also preferably within a suitable range.

Specifically, the gas permeability (Gurley value) of a separator is preferably 200 (second/100 cc) or less. As the gas permeability of a separator is preferably 200 (second/100 cc) or less, gas release is improved so that a battery with good capacity retention rate after cycles is obtained, and also sufficient prevention of short circuit and sufficient mechanical properties as a function of a separator are obtained. The lower limit of the gas permeability is, although not particularly limited, generally 50 (second/100 cc) or more. The gas permeability of a separator is a value based on the measurement method of JIS P8117 (2009).

Furthermore, the porosity of the separator is 40 to 65%, preferably 45 to 60%, and more preferably 50 to 58%. When the porosity of the separator is 40 to 65%, gas release is improved so that a battery with good capacity retention rate after cycles is obtained, and also sufficient prevention of short circuit and sufficient mechanical properties as a function of a separator are obtained. As for the porosity, the value obtained as a volume ratio which is obtained from the density of a resin as a raw material of a separator and the density of a separator in a final product is used. For example, when the density of a raw material is $\rho$ and the volume density of a separator is $\rho'$, the porosity is as follows: porosity=$100 \times (1-\rho'/\rho)$.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a monolayer or a multilayer. Fine pore diameter of the microporous (microporous membrane) separator is preferably 1 μm or less at most (in general, the pore diameter is about several tens of nanometer).

As a non-woven separator, conventionally known ones such as cotton, rayon, acetate, nylon, polyester, polyolefin such as PP and PE, polyimide and aramid are used either singly or as a mixture. Furthermore, the volume density of a non-woven fabric is not particularly limited as long as sufficient battery characteristics are obtained with an impregnated polymer electrolyte.

The porosity of a non-woven separator is 50 to 90%, and preferably 60 to 80%. It is sufficient that the thickness of a non-woven separator is the same as the thickness of an electrolyte layer, and it is preferably 5 to 200 μm, and particularly preferably 10 to 100 μm.

Herein, as a separator, a separator laminated with a heat resistant insulating layer laminated on at least one surface of a resin porous substrate (an above-mentioned microporous membrane or non-woven separator) is preferable. The heat resistant insulating layer is a ceramic layer containing inorganic particles and a binder. By having a heat resistant insulating layer, internal stress in a separator which increases under temperature increase is alleviated so that the effect of inhibiting thermal shrinkage can be obtained. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating an electric device. Furthermore, the ceramic layer may also function as a means for releasing gas to improve the property of releasing gas from a power generating element, and therefore desirable.

Furthermore, in the present invention, the center line average roughness (Ra) on a surface on the negative electrode active material layer side of a separator having a heat resistant insulating layer is 0.1 to 1.2 μm, preferably 0.2 to 1.1 μm, and more preferably 0.25 to 0.9 μm.

[Current Collecting Plate (Tab)]

In a lithium ion secondary battery, a current collecting plate (tab) electrically connected to a current collector is led to the outside of a laminate film as an outer casing material, for the purpose of drawing the current to outside of a battery.

The material for forming the current collecting plate (18, 19) is not particularly limited, and a known highly conductive material which has been conventionally used for a current collecting plate for a lithium ion secondary battery can be used. Preferred examples of the material for forming a current collecting plate include metal materials such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 19 and the negative electrode current collecting plate 18.

[Seal Part]

The seal part is a specific member for a series lamination type battery, and it has a function of preventing leakage of an electrolyte layer. In addition, it can prevent a contact between neighboring current collectors in a battery or an occurrence of short circuit caused by slight irregularities on a tip of a laminated electrode.

Examples of the materials for constituting the seal part which may be used include, although not particularly limited, a polyolefin resin like polyethylene and polypropylene, an epoxy resin, rubber, and polyimide. Among them, from the viewpoint of corrosion resistance, chemical resistance, film forming property, and economic value or the like, the polyolefin resin is preferably used.

[Positive Electrode Lead and Negative Electrode Lead]

Further, although it is not illustrated, the current collector 11, 14 and the current collecting plate (18, 19) can be electrically connected to each other via a positive electrode lead or a negative electrode lead. The same material used for a lithium ion secondary battery of a related art can be also used as a material for forming a positive electrode lead and a negative electrode lead. Meanwhile, a portion led from an outer casing is preferably coated with a heat resistant and insulating thermally shrunken tube or the like so that it has no influence on a product (for example, an automobile component, in particular, an electronic device or the like) according to electric leak after contact with neighboring instruments or wirings.

[Battery Outer Casing Body]

The battery outer casing body 22 is a member for encasing a power generating element within it, and an envelope-shaped casing or the like for covering the power generating element and using a laminate film including aluminum can be used. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and an electrode with large area can be provided, a laminate film in which the power generating element has a lamination structure and the outer casing contains aluminum is preferable.

For encasing the power generating element 17, the battery outer casing body 22 is configured such that is has larger internal volume than the volume of the power generating element 17. As described herein, the internal volume of an outer casing indicates the volume within an outer casing after sealing with an outer casing but before performing a vacuum treatment. Furthermore, the volume of a power generating element indicates the volume which is spatially occupied by a power generating element, including an empty part within a power generating element. As the internal volume of an outer casing is larger than the volume of a power generating element, a space for collecting gas at the time of having gas generation is provided. Accordingly, the property of releasing gas from a power generating element is enhanced, and as a result, it is unlikely for the generated gas to affect the behavior of a battery, and thus the battery characteristics are improved.

In this embodiment, the extra space present inside an outer casing is preferably present at least vertically above the power generating element. By having this configuration, the generated gas can be stored in a region which is vertically above the power generating element having extra space. Accordingly, compared to a case in which an extra space is present in a lateral region or a lower region of a power generating element, the electrolyte solution can be primarily present in a lower region inside the outer casing in which the power generating element is present. As a result, a state in which the power generating element is constantly immersed in a relatively large amount of an electrolyte solution is ensured so that a decrease in battery performance accompanying liquid depletion can be suppressed to a minimum level. Meanwhile, there is no specific limitation regarding the specific configuration for having an extra space vertically above the power generating element. However, there can be a configuration in which the material or the shape of an outer casing itself is selected so as not to allow swelling toward a lateral side or a lower side of a power generating element, or a configuration in which a member for preventing swelling of an outer casing toward the lateral side or lower side is disposed on the outer side of an outer casing.

Nowadays, a large size battery is required for an application in an automobile or the like. According to this embodiment, the large size of a battery structure having a power generating element covered with an outer casing is preferred from the viewpoint of having better exhibition of the effect of the embodiment. Specifically, the negative electrode active material layer has a rectangular shape (square shape or rectangle shape), and length of a single side of the rectangle is 110 mm or more, preferably 120 mm or more, and more preferably 130 mm or more. This large size battery can be used for an automobile or the like. Herein, the length of a single side of a negative electrode active material layer relates to the side having the shortest length in each electrode. The upper limit of length of a single side of a negative electrode active material layer is not particularly limited, but it is generally 250 mm or less.

It is also possible to determine the large size of a battery in view of a relationship between battery area or battery capacity, from the viewpoint of a large size battery, which is different from a physical size of an electrode. According to this embodiment, it is preferable that the battery capacity is 3 Ah or more and the ratio value of a battery area (projected area of a battery including an outer casing of a battery) to battery capacity is 5 $cm^2$/Ah or more as described above. In a related art, when an electrode with large area is used, the resistance deviation in a plane, which is caused by particle non-uniformity among the active materials that is generally small enough to be ignored, becomes to exhibit a large influence. Accordingly, over-voltage is applied in local region to cause new problems like decomposition of an electrolyte solution and structural change of an active material in a positive electrode and degradation (reduction) of cycle characteristics in a negative electrode as a result of Li precipitation. This problem is particularly significant in rapid charge that is required for an application in an automobile. However, by satisfying the requirement of this embodiment, it can be used for a non-aqueous electrolyte secondary battery (large size cell) with high output (low resistance) and high capacity that is used for an automobile like EV, HEV, and FCV without having the aforementioned problem, and thus preferable. Furthermore, the aspect ratio of a rectangular electrode with large area is preferably 1 to 3, and more preferably 1 to 2. Meanwhile, the aspect ratio of an electrode is defined by longitudinal/transversal ratio of a positive electrode active material layer with a rectangular shape. By having the aspect ratio in this range, it becomes possible to discharge the gas uniformly in plane direction, and thus it is advantageous to further suppressing formation of a non-uniform coating film.

The effect of the of this embodiment is as described below.

As the zeta ($\zeta$) potential between an active material and a conductive aid in a battery with low resistance and high capacity (large size cell) is controlled, a deviation in resistance in an electrode with large area can be suppressed.

As the deviation in resistance in an electrode with large area is suppressed, decomposition of an electrolyte solution and structural change of an active material in a positive electrode and also the Li precipitation in a negative electrode, which are caused by over-voltage in local region, can be suppressed.

As a result, the cycle characteristics of a battery (large size cell) with high output (low resistance) and high capacity can be improved.

[Assembled Battery]

An assembled battery is formed by connecting plural batteries. Specifically, at least two of them are used in series, in parallel, or in series and parallel. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source for operating a vehicle requiring high volume energy density and high volume output density or an auxiliary power source, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The non-aqueous electrolyte secondary battery (large size cell) with high output (low resistance) and high capacity of this embodiment has excellent output characteristics, can main maintain discharge capacity even when it is used for a long period of time, and thus has good cycle characteristics. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. As such, the non-aqueous electrolyte secondary battery (large size cell) with high output (low resistance) and high capacity of this embodiment can be preferably used as a power source for a vehicle, for example, as a power source for operating a vehicle or as an auxiliary power source.

Specifically, the battery of this embodiment or an assembled battery formed by combining plural batteries can be mounted on a vehicle. According to this embodiment, a battery with excellent long term reliability, output characteristics, and long service life can be formed, and thus, by mounting this battery, a plug-in hybrid electric vehicle with long EV driving distance or an electric vehicle with long driving distance per charge can be achieved. That is because, when the battery of this embodiment or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

Descriptions are given below in more detail in view of Examples and Comparative Examples, but the technical scope of the present invention is not limited to the Examples given below.

Specifically, the operations described in each example described below are performed to produce a lamination type battery and the performance of the battery was evaluated.

Example 1

1. Production of Positive Electrode Active Material

To an aqueous solution in which nickel sulfate, cobalt sulfate, and aluminum sulfate are dissolved therein, sodium hydroxide and ammonia were supplied, and according to a co-precipitation method, metal composite hydroxide in which nickel, cobalt, and aluminum are solid-dissolved at molar ratio of 80:15:5 was produced. The metal composite hydroxide and commercially available lithium hydroxide monohydrate (manufactured by FMC) were weighed such that the ratio between the total mole number of metals (Ni, Co, and Al) other than Li and the mole number of Li is 1:1, and then thoroughly mixed to obtain a raw material mixture. The resulting raw material mixture was heated at temperature increase rate of 5° C./min, subjected to temporary calcination at 450° C. for 4 hours in oxygen atmosphere, heated at temperature increase rate of 3° C./min, and then subjected to main calcination at 730° C. for 10 hours. After cooling it to room temperature, a positive electrode active material (average particle diameter of 20 μm) with compositional formula; $Li(Ni_{0.8}Co_{0.15}Al_{0.05})O_2$ was obtained.

Meanwhile, although the calcination temperature has been modified in the following Examples and Comparative Examples, the composition of an active material particle remains the same at any calcination temperature. Only the uniformity (degree) of distribution of an insulation coating film (coating film of amorphous (non-crystalline) oxide which does not inhibit the desorption and absorption of lithium (charge and discharge reaction)), which is formed simultaneously with production of an active material, has changed. The characteristic of the present invention is to suppress the resistance deviation resulting from non-uniformity in a positive electrode, which is caused by having an electrode with large area. As a parameter for examining the uniformity in an electrode, the zeta (ζ) potential was used (=it is not an insulation coating amount). As such, the compositional formula and average particle diameter of the positive electrode active material obtained from following Examples 2 to 31 and Comparative Examples 1 to 3 remain the same as those of Example 1.

2. Production of Positive Electrode

For producing a positive electrode, a suitable amount of N-methyl-2-pyrrolidone (NMP) as a solvent for controlling slurry viscosity was added to a solid matter consisting of 90% by mass of the positive electrode active material, 5% by mass of a conductive aid, and 5% by mass of a binder to prepare a slurry of positive electrode active material.

Herein, as for the aforementioned positive electrode active material, the material obtained from above "Production of positive electrode active material" was used.

As for the aforementioned conductive aid, a mixture in which SuperP (average particle diameter of 40 nm) manufactured by TIMCAL of which specific surface area is 62 $m^2/g$ as a first conductive aid and KS6 (average particle diameter of 3 μm) manufactured by TIMCAL of which specific surface area is 20 $m^2/g$ as a second conductive aid are admixed at 1:1 (mass ratio) was used.

As for the aforementioned binder, polyvinylidene fluoride (PVDF) was used.

The obtained slurry of positive electrode active material was coated on one surface of an aluminum foil (thickness: 20 μm) as a current collector followed by drying. Thereafter, it was subjected to a press treatment to produce a positive electrode having a positive electrode active material layer (thickness of 100 μm) on a single surface.

3. Production of Negative Electrode

For producing a positive electrode, a suitable amount of NMP as a solvent for controlling slurry viscosity was admixed with a solid matter consisting of 90% by mass of the negative electrode active material, 5% by mass of a conductive aid, and 5% by mass of a binder to prepare a slurry of negative electrode active material. Herein, graphite (shape: flake shape, average particle diameter of 20 μm) was used as a negative electrode active material. Acetylene black was used as a conductive aid. PVdF was used as a binder.

The obtained slurry of negative electrode active material was coated on one surface of a copper foil (thickness: 15 μm) as a current collector followed by drying. Thereafter, it was subjected to a press treatment to produce a negative electrode having a negative electrode active material layer (thickness of 80 μm) on a single surface.

4. Fabrication of Battery

The obtained electrodes (positive electrode and negative electrode) were cut to have a square shape with size of 35 cm×35 cm. A separator (material: polypropylene, thickness: 25 μm) to be interposed between the positive electrode and negative electrode was also cut to have a square shape with size of 38 cm×38 cm.

To the non-coated part (peripheral region or terminal region having exposed current collector) of the electrodes (positive electrode and negative electrode), a tab (positive electrode: Al tab, negative electrode: Ni tab) was attached by ultrasonic welding followed by lamination in the order of positive electrode-separator-negative electrode to produce a power generating element (single cell configuration). A power generating element was accommodated in an outer casing which consists of a rectangle-shaped aluminum laminate film. Then, three sides of the peripheral side of the film outer casing were pressed by heat while the tabs of a positive electrode and a negative electrode of the power generating element are led to the outside. As a result, a sealed product having three sealed sides was produced. After that, according to vacuum lamination (vacuum liquid injection) for injecting an electrolyte solution followed by sealing the remaining one side by thermal press, a lithium ion secondary battery was produced.

Meanwhile, as for the aforementioned electrolyte solution, a solution having lithium salt $LiPF_6$ dissolved at 1 M concentration in a mixture solvent of ethylene carbonate (EC) and diethylene carbonate (DEC) mixed at volume ratio of 2:3 was used.

The battery capacity of the obtained lithium ion secondary battery was 5 Ah.

The battery capacity was measured according to the following method.

First, as a constant current mode, the battery was charged to 4.2 V based on constant current mode (CC, current: 0.1 C) at 25° C. Then, after resting for 10 minutes, it was discharged to 2.5 V at constant current (CC, current: 0.1 C) followed by discharge and resting again for 10 minutes. The discharge capacity at that time was used as the battery capacity. The battery capacity was measured in the same manner as the above also for the battery obtained from Examples 2 to 31 and Comparative Examples 1 to 3.

Example 2

In Example 2, a lithium ion secondary battery was fabricated in the same manner as Example 1 except that the main calcination in "Production of positive electrode active material" of Example 1 was modified to 750° C. for 10 hours. Meanwhile, the battery capacity of the obtained lithium ion secondary battery was the same as Example 1.

Example 3

In Example 3, a lithium ion secondary battery was fabricated in the same manner as Example 1 except that the main calcination in "Production of positive electrode active material" of Example 1 was modified to 770° C. for 10 hours. Meanwhile, the battery capacity of the obtained lithium ion secondary battery was the same as Example 1.

Example 4

In Example 4, a lithium ion secondary battery was fabricated in the same manner as Example 1 except that the main calcination in "Production of positive electrode active material" of Example 1 was modified to 790° C. for 10 hours. Meanwhile, the battery capacity of the obtained lithium ion secondary battery was the same as Example 1.

Example 5

In Example 5, a lithium ion secondary battery was fabricated in the same manner as Example 1 except that the main calcination in "Production of positive electrode active material" of Example 1 was modified to 800° C. for 10 hours. Meanwhile, the battery capacity of the obtained lithium ion secondary battery was the same as Example 1.

Example 6

In Example 6, a lithium ion secondary battery was fabricated in the same manner as Example 1 except that, regarding the specifications of 5% by mass of a conductive aid in "Production of positive electrode" of Example 1, the ratio between the first conductive aid and the second conductive aid was modified to 2:1 (mass ratio). Meanwhile, the battery capacity of the obtained lithium ion secondary battery was the same as Example 1.

Example 7

In Example 7, a lithium ion secondary battery was fabricated in the same manner as Example 6 except that the main calcination in "Production of positive electrode active material" of Example 1, which has been referenced in Example 6, was modified to 750° C. for 10 hours. Meanwhile, the battery capacity of the obtained lithium ion secondary battery was the same as Example 1.

Example 8

In Example 8, a lithium ion secondary battery was fabricated in the same manner as Example 6 except that the main calcination in "Production of positive electrode active material" of Example 1, which has been referenced in Example 6, was modified to 770° C. for 10 hours. Meanwhile, the battery capacity of the obtained lithium ion secondary battery was the same as Example 1.

Example 9

In Example 9, a lithium ion secondary battery was fabricated in the same manner as Example 6 except that the main calcination in "Production of positive electrode active material" of Example 1, which has been referenced in Example 6, was modified to 790° C. for 10 hours. Meanwhile, the battery capacity of the obtained lithium ion secondary battery was the same as Example 1.

Example 10

In Example 10, a lithium ion secondary battery was fabricated in the same manner as Example 6 except that the main calcination in "Production of positive electrode active material" of Example 1, which has been referenced in Example 6, was modified to 800° C. for 10 hours. Meanwhile, the battery capacity of the obtained lithium ion secondary battery was the same as Example 1.

Example 11

In Example 11, a lithium ion secondary battery was fabricated in the same manner as Example 1 except that, regarding the specifications of 5% by mass of a conductive aid in "Production of positive electrode" of Example 1, the ratio between the first conductive aid and the second conductive aid was modified to 3:1 (mass ratio). Meanwhile, the battery capacity of the obtained lithium ion secondary battery was the same as Example 1.

Example 12

In Example 12, a lithium ion secondary battery was fabricated in the same manner as Example 11 except that the main calcination in "Production of positive electrode active material" of Example 1, which has been referenced in Example 11, was modified to 750° C. for 10 hours. Meanwhile, the battery capacity of the obtained lithium ion secondary battery was the same as Example 1.

Example 13

In Example 13, a lithium ion secondary battery was fabricated in the same manner as Example 11 except that the main calcination in "Production of positive electrode active material" of Example 1, which has been referenced in Example 11, was modified to 770° C. for 10 hours. Meanwhile, the battery capacity of the obtained lithium ion secondary battery was the same as Example 1.

Example 14

In Example 14, a lithium ion secondary battery was fabricated in the same manner as Example 11 except that the main calcination in "Production of positive electrode active material" of Example 1, which has been referenced in Example 11, was modified to 790° C. for 10 hours. Meanwhile, the battery capacity of the obtained lithium ion secondary battery was the same as Example 1.

Example 15

In Example 15, a lithium ion secondary battery was fabricated in the same manner as Example 11 except that the main calcination in "Production of positive electrode active material" of Example 1, which has been referenced in Example 11, was modified to 800° C. for 10 hours. Meanwhile, the battery capacity of the obtained lithium ion secondary battery was the same as Example 1.

Example 16

In Example 16, a lithium ion secondary battery was fabricated in the same manner as Example 1 except that, regarding the specifications of 5% by mass of a conductive aid in "Production of positive electrode" of Example 1, the ratio between the first conductive aid and the second conductive aid was modified to 4:1 (mass ratio). Meanwhile, the battery capacity of the obtained lithium ion secondary battery was the same as Example 1.

Example 17

In Example 17, a lithium ion secondary battery was fabricated in the same manner as Example 16 except that the main calcination in "Production of positive electrode active material" of Example 1, which has been referenced in Example 16, was modified to 750° C. for 10 hours. Meanwhile, the battery capacity of the obtained lithium ion secondary battery was the same as Example 1.

Example 18

In Example 18, a lithium ion secondary battery was fabricated in the same manner as Example 16 except that the main calcination in "Production of positive electrode active material" of Example 1, which has been referenced in Example 16, was modified to 770° C. for 10 hours. Meanwhile, the battery capacity of the obtained lithium ion secondary battery was the same as Example 1.

Example 19

In Example 19, a lithium ion secondary battery was fabricated in the same manner as Example 16 except that the main calcination in "Production of positive electrode active material" of Example 1, which has been referenced in Example 16, was modified to 790° C. for 10 hours. Meanwhile, the battery capacity of the obtained lithium ion secondary battery was the same as Example 1.

Example 20

In Example 20, a lithium ion secondary battery was fabricated in the same manner as Example 16 except that the main calcination in "Production of positive electrode active material" of Example 1, which has been referenced in Example 16, was modified to 800° C. for 10 hours. Meanwhile, the battery capacity of the obtained lithium ion secondary battery was the same as Example 1.

Example 21

In Example 21, a lithium ion secondary battery was fabricated in the same manner as Example 1 except that, regarding the specifications of 5% by mass of a conductive aid in "Production of positive electrode" of Example 1, the ratio between the first conductive aid and the second conductive aid was modified to 5:1 (mass ratio). Meanwhile, the battery capacity of the obtained lithium ion secondary battery was the same as Example 1.

Example 22

In Example 22, a lithium ion secondary battery was fabricated in the same manner as Example 21 except that the main calcination in "Production of positive electrode active material" of Example 1, which has been referenced in Example 21, was modified to 750° C. for 10 hours. Meanwhile, any one of the composition formula and particle diameter of the obtained positive electrode active material, and the battery capacity of the obtained lithium ion secondary battery were the same as Example 1.

Example 23

In Example 23, a lithium ion secondary battery was fabricated in the same manner as Example 21 except that the main calcination in "Production of positive electrode active material" of Example 1, which has been referenced in Example 21, was modified to 770° C. for 10 hours. Meanwhile, the battery capacity of the obtained lithium ion secondary battery was the same as Example 1.

Example 24

In Example 24, a lithium ion secondary battery was fabricated in the same manner as Example 21 except that the main calcination in "Production of positive electrode active material" of Example 1, which has been referenced in Example 21, was modified to 790° C. for 10 hours. Meanwhile, the battery capacity of the obtained lithium ion secondary battery was the same as Example 1.

Example 25

In Example 25, a lithium ion secondary battery was fabricated in the same manner as Example 21 except that the main calcination in "Production of positive electrode active material" of Example 1, which has been referenced in Example 21, was modified to 800° C. for 10 hours. Meanwhile, the battery capacity of the obtained lithium ion secondary battery was the same as Example 1.

Comparative Example 1

In Comparative Example 1, a lithium ion secondary battery was fabricated in the same manner as Example 1 except that the temporary calcination is not performed and the main calcination in "Production of positive electrode active material" of Example 1 was modified to 900° C. for 10 hours. Meanwhile, the battery capacity of the obtained lithium ion secondary battery was the same as Example 1.

Comparative Example 2

In Comparative Example 2, a lithium ion secondary battery was fabricated in the same manner as Example 1 except that the main calcination in "Production of positive electrode active material" of Example 1 was modified to 700° C. for 10 hours. Meanwhile, the battery capacity of the obtained lithium ion secondary battery was the same as Example 1.

Comparative Example 3

In Comparative Example 3, a lithium ion secondary battery was fabricated in the same manner as Example 1 except that the obtained electrodes (positive electrode and negative electrode) were cut to have a size of 10 cm×10 cm and the separator was cut to have a size of 12 cm×12 cm regarding "Production of positive electrode" of Example 1.

Furthermore, the battery capacity of the obtained lithium ion secondary battery was 2.2 Ah.

Example 26

In Example 26, a lithium ion secondary battery was fabricated in the same manner as Example 21 except that, regarding "Production of negative electrode" of Example 1 which has been referenced in Example 21, a solid matter consisting of 90% by mass of a negative electrode active material, 7% by mass of a conductive aid, and 3% by mass of a binder was used. Meanwhile, the battery capacity of the obtained lithium ion secondary battery was the same as Example 1.

Example 27

In Example 27, a lithium ion secondary battery was fabricated in the same manner as Example 5 except that, regarding the specifications of 5% by mass of a conductive aid in "Production of positive electrode" of Example 1, which has been referenced in Example 5, the ratio between the first conductive aid and the second conductive aid was modified to 1:0 (mass ratio). Namely, a lithium ion secondary battery was fabricated in the same manner as Example 5 except that, as a conductive aid, only SuperP with specific area of 62 $m^2/g$ manufactured by TIMCAL as a first conductive aid was used. Meanwhile, the battery capacity of the obtained lithium ion secondary battery was the same as Example 1.

Example 28

In Example 28, a lithium ion secondary battery was fabricated in the same manner as Example 5 except that, regarding the specifications of 5% by mass of a conductive aid in "Production of positive electrode" of Example 1, which has been referenced in Example 5, the ratio between the first conductive aid and the second conductive aid was modified to 0.5:1 (mass ratio). Meanwhile, the battery capacity of the obtained lithium ion secondary battery was the same as Example 1.

Example 29

In Example 29, a lithium ion secondary battery was fabricated in the same manner as Example 5 except that, regarding the specifications of 5% by mass of a conductive aid in "Production of positive electrode" of Example 1, which has been referenced in Example 5, the ratio between the first conductive aid and the second conductive aid was modified to 6:1 (mass ratio). Meanwhile, the battery capacity of the obtained lithium ion secondary battery was the same as Example 1.

Example 30

In Example 30, a lithium ion secondary battery was fabricated in the same manner as Example 5 except that, regarding the specifications of 5% by mass of a conductive aid in "Production of positive electrode" of Example 1, which has been referenced in Example 5, the ratio between the first conductive aid and the second conductive aid was modified to 0:1 (mass ratio). Namely, a lithium ion secondary battery was fabricated in the same manner as Example 5 except that, as a conductive aid, only KS6 with specific area of 20 $m^2/g$ manufactured by TIMCAL as a second conductive aid was used. Meanwhile, the battery capacity of the obtained lithium ion secondary battery was the same as Example 1.

Example 31

In Example 31, a lithium ion secondary battery was fabricated in the same manner as Example 5 except that carbon black with specific area of 150 $m^2/g$ was used instead of SuperP manufactured by TIMCAL as a first conductive aid in "Production of positive electrode" of Example 1, which has been referenced in Example 5. Meanwhile, the battery capacity of the obtained lithium ion secondary battery was the same as Example 1.

<Cycle Test: Evaluation of Cycle Characteristics>

The lithium ion secondary battery which has been fabricated in Examples 1 to 31 and Comparative Examples 1 to 3 were charged to 4.2 V based on constant current mode (CC, current: 2 C) at 25° C. Then, after resting for 10 minutes, it was discharged to 2.5 V at constant current (CC, current: 1 C) followed by discharge and resting again for 10 minutes. By having this process of charge and discharge as one cycle, 300 cycles were repeated. After measuring the discharge capacity retention rate after certain number of the cycles, the cycle characteristics were evaluated.

<Measurement of Zeta Potential>

The zeta potential was measured according to the following method.

First, the positive electrode active material which has been used for "Production of positive electrode" of each Examples and each Comparative Example and a conductive aid were admixed with each other in a solvent (NMP), and the sample obtained after allowing it to stand for a while was additionally added to the solve (NMP) followed by stifling, and measurement using a zeta potentiometer was carried out. As for the device, the zeta potentiometer (ZEECOM, manufactured by Microtec Co., Ltd.) was used. Specifically, 5 mg of the sample was added to 200 mL of NMP and the measurement was performed under stirring till to have uniform liquid color in the flask.

<Calculation of Reaction Resistance Ratio (Negative Electrode/Positive Electrode)>

The non-aqueous electrolyte secondary battery which has been produced in Examples 1 to 31 and Comparative Examples 1 to 3 was adjusted to an "initial" state according to the following method.

First, the battery obtained after injecting an electrolyte solution was charged to 4.2 V based on constant current mode (CC, current: 0.1 C) at 25° C. Then, after resting for 10 minutes, it was discharged to 2.5 V at constant current (CC, current: 0.1 C) followed by discharge and resting again for 10 minutes.

The resulting state was set as an "initial" state. Next, the reaction resistance of the non-aqueous electrolyte secondary battery which has been produced in Examples 1 to 31 and Comparative Examples 1 to 3 was measured according to the following method and the reaction resistance ratio (negative electrode/positive electrode) [−] was calculated.

First, the battery in the "initial" state was charged to 3.9 V based on constant current mode (CC, current: 1 C) at 25° C. Then, after resting for 10 minutes, it was discharged for 20 seconds at constant current (CC, current: 1 C) followed by discharge and resting again for 10 minutes. By connecting to an impedance analyzer (manufactured by Solartron), the alternating current impedance was measured. The frequency was set at 0.05 Hz to 3000 Hz. From the arc size of each of the positive electrode and negative electrode, the reaction resistance ratio between the positive electrode and negative electrode was calculated.

<Measurement of Battery Internal Resistance•Absolute Value>

According to the following method, the non-aqueous electrolyte secondary battery which has been produced in Examples 1 to 31 and Comparative Examples 1 to 3 were tested to measure the battery internal resistance•absolute value (mΩ).

First, the battery was charged to 3.9 V based on constant current mode (CC, current: 1 C) at 25° C. Then, after resting for 10 minutes, it was discharged for 20 seconds at constant current (CC, current: 1 C) followed by discharge and resting again for 10 minutes. Then, the resistance measured from the voltage drop based on Ohm's law was determined as a battery internal resistance•absolute value. At that time, by connecting to an impedance analyzer (manufactured by Solartron), the alternating current impedance was measured. The frequency was set at 0.05 Hz to 3000 Hz.

<Measurement of Battery Internal Resistance•Area Defined Value>

According to the following method, the non-aqueous electrolyte secondary battery which has been produced in Examples 1 to 31 and Comparative Examples 1 to 3 were tested to measure the battery internal resistance•area defined value (Ω·cm$^2$).

First, the battery was charged to 3.9 V based on constant current mode (CC, current: 1 C) at 25° C. Then, after resting for 10 minutes, it was discharged for 20 seconds at constant current (CC, current: 1 C) followed by discharge and resting again for 10 minutes. Then, the resistance measured from the voltage drop based on Ohm's law was determined as a battery internal resistance. The value of battery internal resistance was multiplied by the cell area to have the resistance value per unit area. The resultant was determined as a battery internal resistance•area defined value.

The results obtained from measurement of zeta potential and cycle characteristics of the non-aqueous electrolyte secondary battery which has been produced in Examples 1 to 31 and Comparative Examples 1 to 3 are given in Table 1. Meanwhile, in Table 1, the discharge capacity for each cycle relative to discharge capacity for single cycle is expressed in percentage ratio.

TABLE 1

|  | Temperature for main calcination of active material [° C.] | Zeta potential ξ [mV] | Absolute value of battery internal resistance [mΩ] | Battery internal resistance area defined value [Ω·cm$^2$] | First conductive aid:Second conductive aid [mass ratio] | Initial reaction resistance ratio (negative electrode/ positive electrode) [—] | Capacity retention rate [vs. 1st cycle] [%] @ 300 cycle |
|---|---|---|---|---|---|---|---|
| Example 1 | 730 | −0.3 | 20 | 24.5 | 1:1 | 1.1 | 89 |
| Example 2 | 750 | −0.7 | 20 | 24.5 | 1:1 | 1.12 | 90 |
| Example 3 | 770 | −0.8 | 20 | 24.5 | 1:1 | 1.13 | 89 |
| Example 4 | 790 | −1 | 20 | 24.5 | 1:1 | 1.14 | 88 |
| Example 5 | 800 | −1 | 20 | 24.5 | 1:1 | 1.14 | 87 |
| Example 6 | 730 | −0.3 | 20 | 24.5 | 2:1 | 1 | 90 |
| Example 7 | 750 | −0.7 | 20 | 24.5 | 2:1 | 1.02 | 91 |
| Example 8 | 770 | −0.8 | 20 | 24.5 | 2:1 | 1.03 | 90 |
| Example 9 | 790 | −1 | 20 | 24.5 | 2:1 | 1.04 | 89 |
| Example 10 | 800 | −1 | 20 | 24.5 | 2:1 | 1.04 | 88 |
| Example 11 | 730 | −0.3 | 20 | 24.5 | 3:1 | 0.9 | 92 |
| Example 12 | 750 | −0.7 | 20 | 24.5 | 3:1 | 0.92 | 93 |
| Example 13 | 770 | −0.8 | 20 | 24.5 | 3:1 | 0.93 | 92 |
| Example 14 | 790 | −1 | 20 | 24.5 | 3:1 | 0.94 | 91 |
| Example 15 | 800 | −1 | 20 | 24.5 | 3:1 | 0.94 | 90 |
| Example 16 | 730 | −0.3 | 20 | 24.5 | 4:1 | 0.8 | 91 |
| Example 17 | 750 | −0.7 | 20 | 24.5 | 4:1 | 0.82 | 92 |
| Example 18 | 770 | −0.8 | 20 | 24.5 | 4:1 | 0.83 | 91 |
| Example 19 | 790 | −1 | 20 | 24.5 | 4:1 | 0.84 | 90 |
| Example 20 | 800 | −1 | 20 | 24.5 | 4:1 | 0.84 | 89 |
| Example 21 | 730 | −0.3 | 20 | 24.5 | 5:1 | 0.7 | 90 |
| Example 22 | 750 | −0.7 | 20 | 24.5 | 5:1 | 0.72 | 91 |
| Example 23 | 770 | −0.8 | 20 | 24.5 | 5:1 | 0.73 | 90 |
| Example 24 | 790 | −1 | 20 | 24.5 | 5:1 | 0.74 | 89 |
| Example 25 | 800 | −1 | 20 | 24.5 | 5:1 | 0.74 | 88 |
| Comparative Example 1 | 900 | −2.5 | 20 | 24.5 | 1:1 | 1.12 | 80 |
| Comparative Example 2 | 700 | −0.1 | 20 | 24.5 | 1:1 | 1 | 81 |
| Comparative Example 3 | 730 | −0.3 | 800 | 80 | 1:1 | 1 | 80 |
| Example 26 | 730 | −0.3 | 20 | 24.5 | 5:1 | 0.65 | 85 |
| Example 27 | 800 | −1 | 20 | 24.5 | 1:0 | 0.6 | 82 |
| Example 28 | 800 | −1 | 20 | 24.5 | 0.5:1 | 1.25 | 83 |
| Example 29 | 800 | −1 | 20 | 24.5 | 6:1 | 0.62 | 84 |
| Example 30 | 800 | −1 | 20 | 24.5 | 0:1 | 1.32 | 82 |
| Example 31 | 800 | −1 | 20 | 24.5 | 1:1 | 0.72 | 87 |

According to Examples 1 to 31 in which the battery capacity and ζ potential of a positive electrode are set within a pre-determined range, the capacity retention rate of a battery was increased compared to Comparative Examples 1 to 3 in which the battery capacity or ζ potential of a positive electrode was not within a pre-determined range, and it was found that the battery durability was improved accordingly in Examples. In this regard, it can be said that, based on optimization of temporary calcination and calcination temperature and also optimization of the blending of a conductive aid, the numerical value of zeta potential is increased so that the cycle characteristics can be improved.

With regard to Examples 1 to 31, it was further found that the capacity retention rate was improved in Examples 1 to 25 in which, in addition to the battery capacity and positive electrode ζ potential, reaction resistance ratio, the battery internal resistance, and ratio between the first conductive aid and the second conductive aid which have different specific surface area were within a pre-determined range, compared to Examples 26 to 31 in which any one of those properties was not within the range.

The invention claimed is:

1. A non-aqueous electrolyte secondary battery comprising a positive electrode which comprises an active material and a conductive aid, a negative electrode, and an electrolyte layer and having battery capacity of 3 Ah or more and an absolute value of battery internal resistance of 30 mΩ or less, wherein the zeta (ζ) potential between the active material and the conductive aid is in the range of 0.3 mV to 2 mV as an absolute value, and wherein the conductive aid of the positive electrode comprises a first conductive aid with specific surface area of 40 to 100 m$^2$/g and a second conductive aid with specific surface area of 15 to 35 m$^2$/g at mixing ratio of 1:1 to 5:1 (mass ratio).

2. The non-aqueous electrolyte secondary battery according to claim 1, wherein the area defined value of battery internal resistance is 40 Ω·cm$^2$ or less and the reaction resistance ratio between the positive electrode and negative electrode (negative electrode/positive electrode) is in the range of 0.7 to 1.3.

* * * * *